(12) United States Patent
Zhang et al.

(10) Patent No.: US 10,992,570 B2
(45) Date of Patent: Apr. 27, 2021

(54) PACKET FORWARDING METHOD AND DEVICE FOR A VIRTUAL PRIVATE WIRE SERVICE (VPWS) PSEUDO WIRE (PW) NETWORK USING TRAFFIC BALANCING

(71) Applicant: Huawei Technologies Co., Ltd., Shenzhen (CN)

(72) Inventors: Yaokun Zhang, Beijing (CN); Chunxia Sun, Beijing (CN); Juan Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 16/360,897

(22) Filed: Mar. 21, 2019

(65) Prior Publication Data
US 2019/0222509 A1 Jul. 18, 2019

Related U.S. Application Data

(63) Continuation of application No. PCT/CN2017/094165, filed on Jul. 24, 2017.

(30) Foreign Application Priority Data

Dec. 20, 2016 (CN) .......................... 201611187143.3

(51) Int. Cl.
*H04L 12/703* (2013.01)
*H04L 12/28* (2006.01)
(Continued)

(52) U.S. Cl.
CPC ............ *H04L 45/28* (2013.01); *H04L 12/287* (2013.01); *H04L 12/2878* (2013.01);
(Continued)

(58) Field of Classification Search
CPC ....... H04L 45/28; H04L 45/68; H04L 12/287; H04L 12/2878; H04L 41/0668; H04L 47/125
See application file for complete search history.

(56) References Cited

U.S. PATENT DOCUMENTS

2004/0133619 A1* 7/2004 Zelig ....................... H04L 69/40
709/200
2007/0008982 A1* 1/2007 Voit ....................... H04L 12/462
370/401
(Continued)

FOREIGN PATENT DOCUMENTS

CN 101345715 A 1/2009
CN 102025541 * 4/2011
(Continued)

OTHER PUBLICATIONS

Machine Translation and Abstract of Chinese Publication No. CN101345715, Jan. 14, 2009, 21 pages.
(Continued)

*Primary Examiner* — Jenee Holland
(74) *Attorney, Agent, or Firm* — Conley Rose, P.C.

(57) ABSTRACT

A packet forwarding method, a device, and a system, where a first provider edge (PE) device separately sends request packets to a second PE device and a third PE device. The second PE device receives the two request packets separately using a primary pseudo wire (PW) and using a secondary PW, the third PE device, and a bypass PW, switches preferential forwarding statuses relative to the primary PW and the bypass PW to a balance state, and then, notifies the first PE device and the third PE device using a response packet. The first PE device switches preferential forwarding statuses relative to the primary PW and the secondary PW to the balance state based on the response packet. The third PE device switches a preferential forward-
(Continued)

ing status relative to the bypass PW to the balance state based on the response packet.

26 Claims, 19 Drawing Sheets

(51) Int. Cl.
*H04L 12/24* (2006.01)
*H04L 12/803* (2013.01)
*H04L 12/721* (2013.01)
*H04L 12/801* (2013.01)

(52) U.S. Cl.
CPC .......... *H04L 41/0668* (2013.01); *H04L 45/68* (2013.01); *H04L 47/125* (2013.01)

(56) References Cited

U.S. PATENT DOCUMENTS

| | | | | |
|---|---|---|---|---|
| 2008/0253381 | A1* | 10/2008 | Ward | H04L 45/10 370/396 |
| 2012/0147737 | A1* | 6/2012 | Taylor | H04L 41/08 370/219 |
| 2012/0170449 | A1* | 7/2012 | Nakash | H04L 45/28 370/225 |
| 2013/0272114 | A1 | 10/2013 | Ye | |
| 2015/0006757 | A1* | 1/2015 | Boutros | H04L 12/4641 709/242 |
| 2015/0156108 | A1 | 6/2015 | Shi | |

FOREIGN PATENT DOCUMENTS

| | | |
|---|---|---|
| CN | 102025541 A | 4/2011 |
| CN | 102201999 A | 9/2011 |
| CN | 102223660 A | 10/2011 |
| CN | 103490969 A | 1/2014 |
| CN | 103731288 A | 4/2014 |
| CN | 104753754 A | 7/2015 |
| EP | 2555467 A1 | 2/2013 |
| EP | 2661847 A1 | 11/2013 |
| EP | 2733979 B1 | 3/2016 |
| WO | 2008127878 A1 | 10/2008 |
| WO | 2013139406 A1 | 9/2013 |

OTHER PUBLICATIONS

Machine Translation and Abstract of Chinese Publication No. CN102025541, Apr. 20, 2011, 12 pages.
Machine Translation and Abstract of Chinese Publication No. CN104753754, Jul. 1, 2015, 13 pages.
Martini, L., Ed., et al., "Pseudowire Setup and Maintenance, Using the Label Distribution Protocol (LDP)," RFC 1447, Apr. 2006, 33 pages.
Muley, P., Ed et al., "Pseudowire Preferential Forwarding Status Bit," RFC 6870, Feb. 2013, 35 pages.
Foreign Communication From a Counterpart Application, PCT Application No. PCT/CN2017/094165, English Translation of International Search Report dated Sep. 15, 2017, 2 pages.
Foreign Communication From a Counterpart Application, PCT Application No. PCT/CN2017/094165, Written Opinion dated Sep. 15, 2017, 4 pages.
Bocci, M., et al., "Network High Availability for Ethernet Services Using IP/MPLS Networks," XP011205402, IEEE Communications Magazine, IEEE Service Center, Piscataway, US, vol. 45, No. 3, Mar. 31, 2008, 8 pages.
Foreign Communication From a Counterpart Application, European Application No. 17884866.9, Extended European Search Report dated Jun. 21, 2019, 6 pages.

* cited by examiner

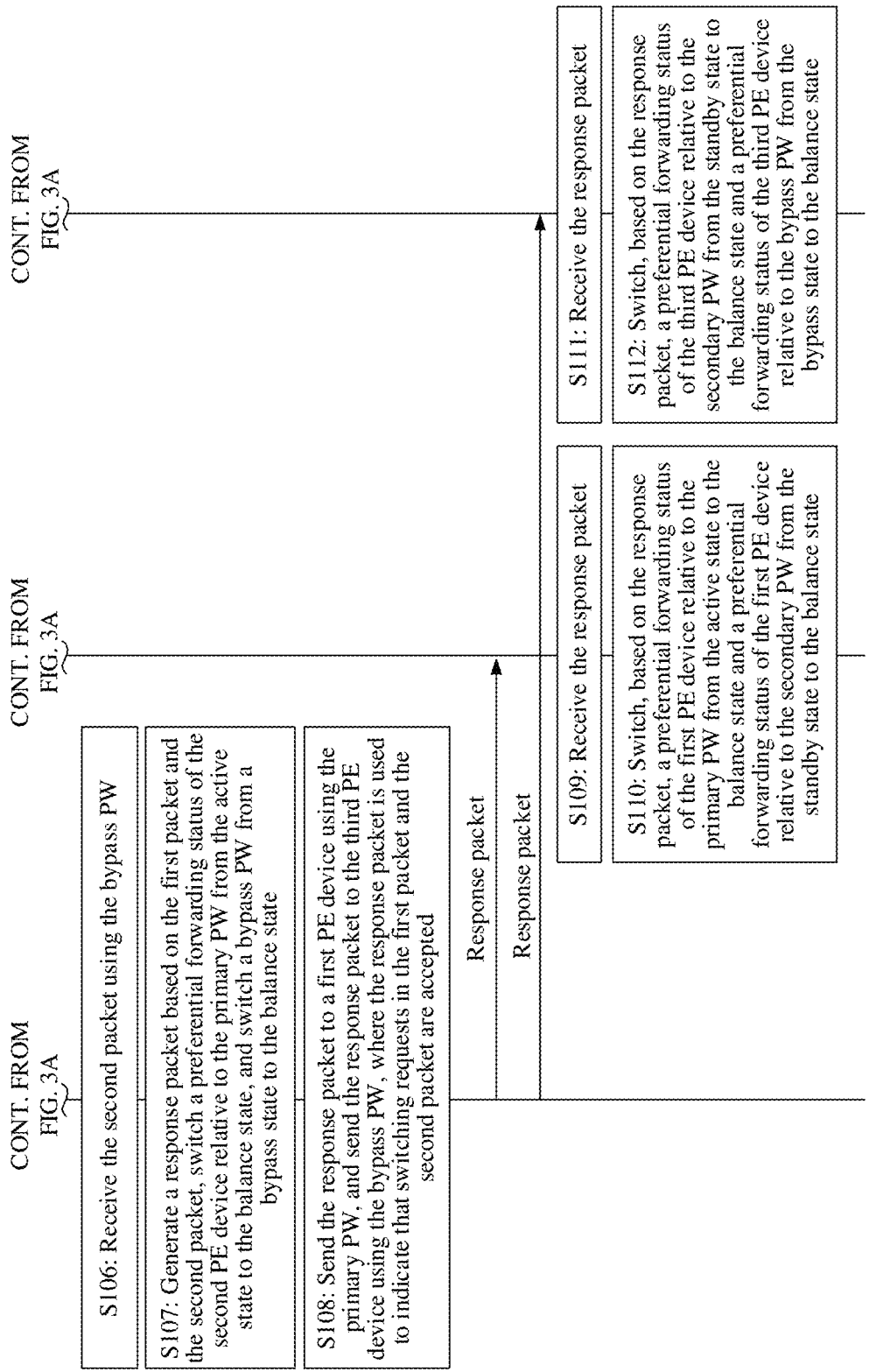

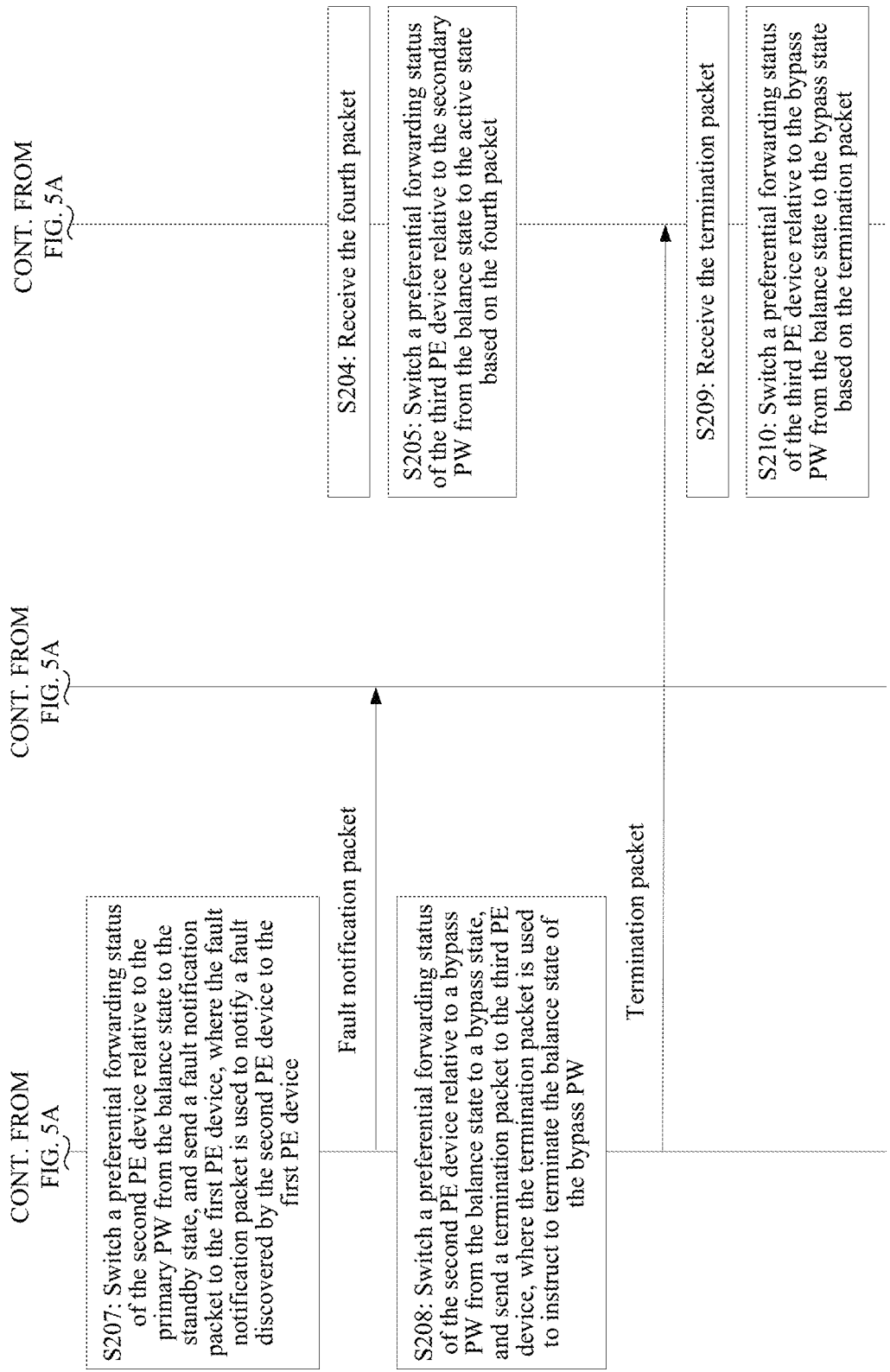

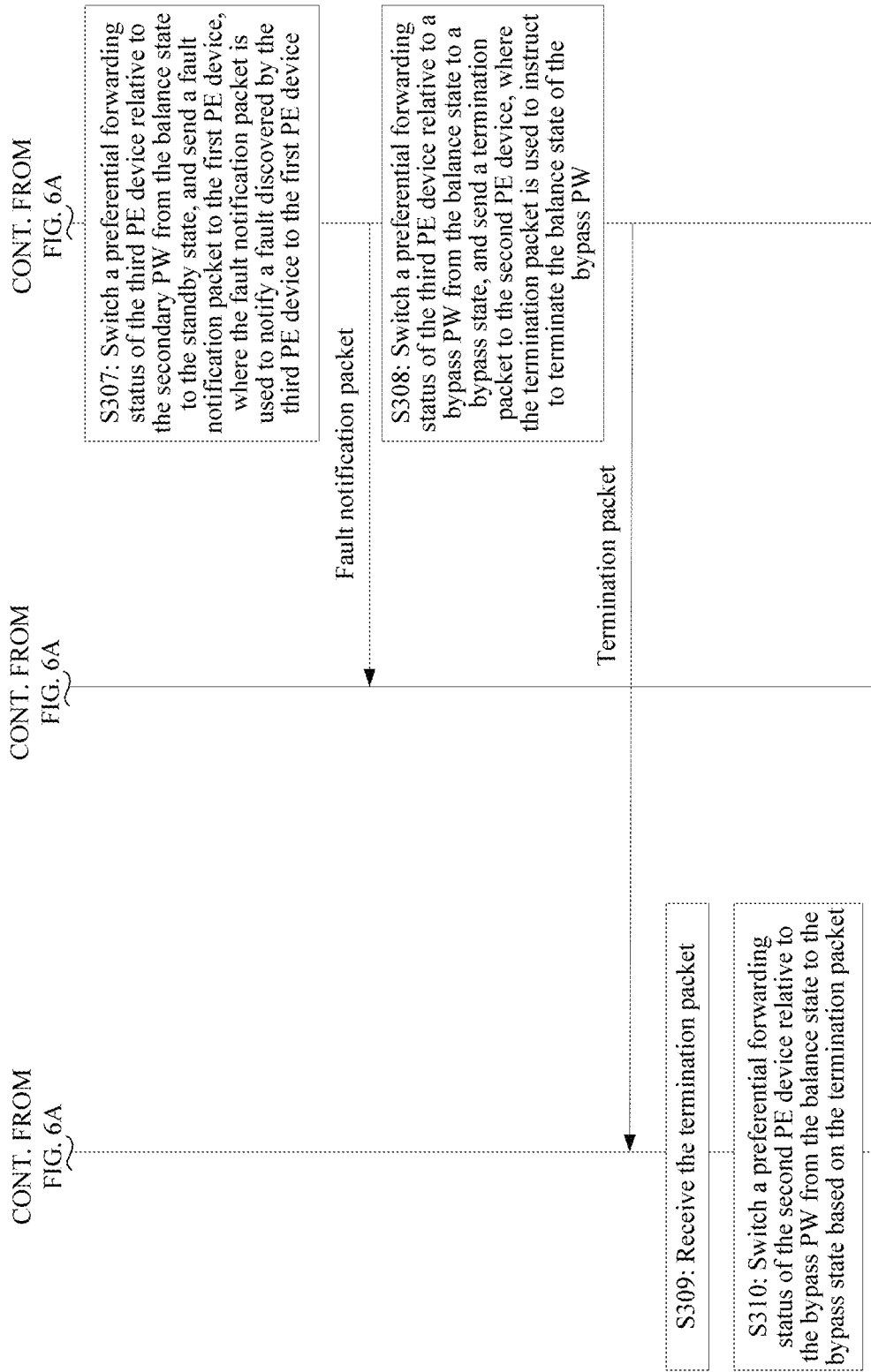

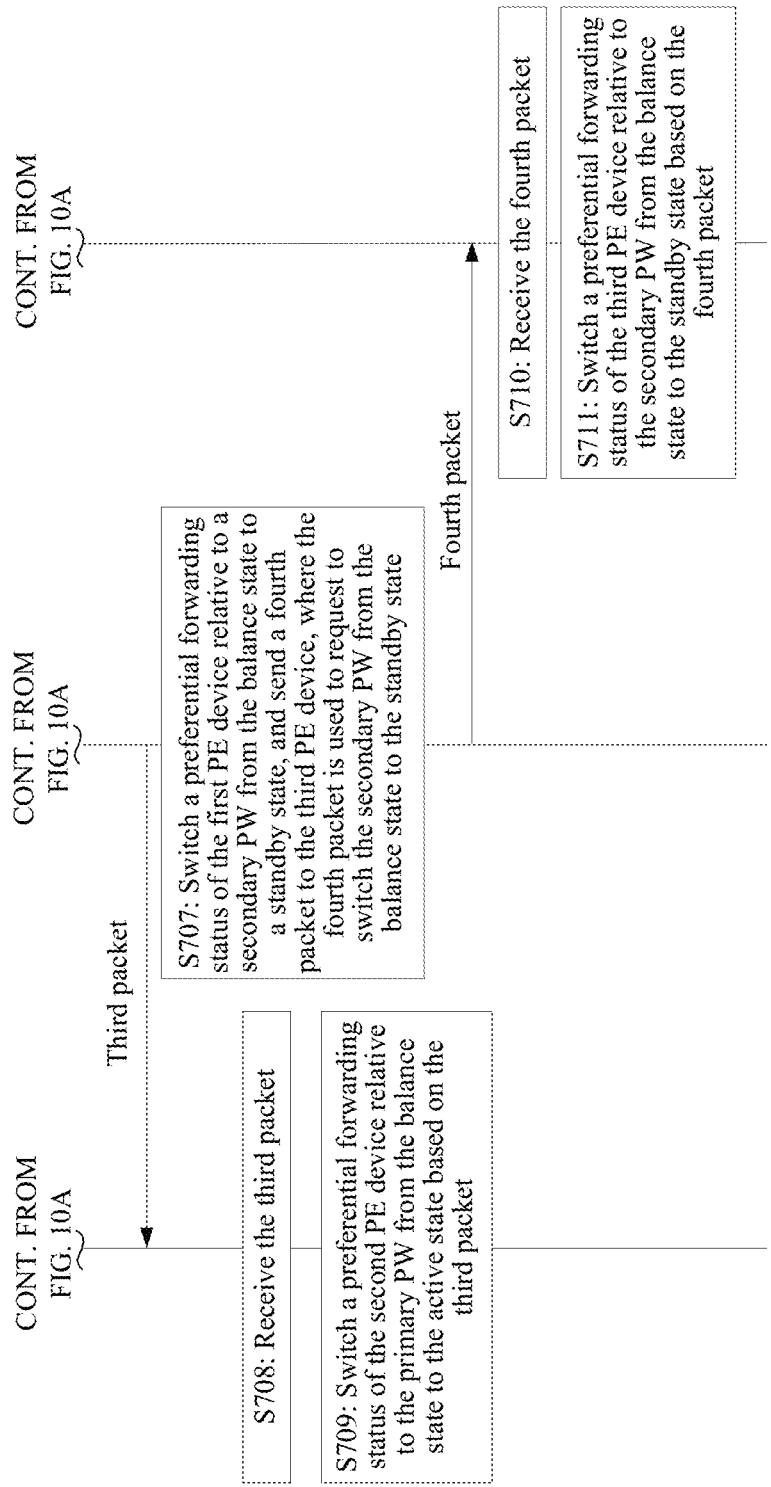

PACKET FORWARDING METHOD AND DEVICE FOR A VIRTUAL PRIVATE WIRE SERVICE (VPWS) PSEUDO WIRE (PW) NETWORK USING TRAFFIC BALANCING

CROSS-REFERENCE TO RELATED APPLICATIONS

This application is a continuation of International Patent Application No. PCT/CN2017/094165 filed on Jul. 24, 2017, which claims priority to Chinese Patent Application No. 201611187143.3 filed on Dec. 20, 2016. The disclosures of the aforementioned applications are hereby incorporated by reference in their entireties.

TECHNICAL FIELD

This application relates to the field of communications technologies, and in particular, to a packet forwarding method, a device, and a system. Furthermore, this application relates to pseudo wire (PW) redundancy technologies.

BACKGROUND

In a PW redundancy technology, a protection mechanism of a provider edge (PE) device or an attachment circuit (AC) in a dual-homing scenario of a customer edge (CE) device is provided based on a PW emulation edge-to-edge (PWE3) system. A primary PW and a secondary PW are configured to form a PW redundancy group. All PWs in the PW redundancy group can be used to forward data traffic, but only one PW is used to forward data traffic at any time. Generally, the primary PW is used to forward data traffic. When a failure occurs in the primary PW, the data traffic is rapidly switched to the secondary PW for forwarding. When the primary PW recovers, the data traffic is switched back to the primary PW for forwarding.

A virtual private wire service (VPWS) PW is a specific implementation of the PW redundancy technology. A VPWS may also be referred to as a virtual leased line (VLL). The VPWS is a layer 2 service bearer technology in which basic behavior and features of services such as an asynchronous transfer mode (ATM) service, a frame relay (FR) service, an Ethernet service, a low-speed time division multiplexing (TDM) circuit service, and a synchronous optical network (SONET)/synchronous digital hierarchy (SDH) service are simulated in a packet switched network (PSN) as closely as possible.

In an embodiment, a primary PW and a secondary PW in the VPWS PW implement a redundancy protection function. However, because only one PW is used to forward data traffic at any time, a bandwidth resource of a PW redundancy group cannot be fully used. For example, when a primary PW is used to forward data traffic, a secondary PW is in a standby state, and no data traffic is forwarded on the secondary PW. Even though a bandwidth resource of the primary PW is insufficient, a bandwidth resource of the secondary PW cannot be used.

SUMMARY

In view of this, embodiments of this application provide a packet forwarding method, a device, and a system, to help improve bandwidth utilization of a VPWS PW when redundancy protection functions of a primary PW and a secondary PW in the VPWS PW are reserved.

Technical solutions provided in the embodiments of this application are as follows.

According to a first aspect, a packet forwarding method is provided. The method is applied to a VPWS PW redundancy network, and the VPWS PW redundancy network includes a first PE device, a second PE device, and a third PE device. A primary PW is set up between the first PE device and the second PE device, a secondary PW is set up between the first PE device and the third PE device, and a bypass PW is set up between the second PE device and the third PE device. The method includes sending, by the first PE device, a first packet (the first packet is, for example, a PW status notification packet, and may be a label distribution protocol (LDP) packet) to the second PE device using the primary PW, where the first packet is used to request to switch the primary PW from an active state of forwarding traffic to a balance state of forwarding traffic, and the balance state is used to instruct to forward traffic in a traffic balancing manner, sending, by the first PE device, a second packet (the second packet is, for example, a PW status notification packet, and may be an LDP packet) to the third PE device using the secondary PW, where the second packet is used to request to switch the secondary PW from a standby state of not forwarding traffic to the balance state of forwarding traffic, then receiving, by the first PE device, a response packet from the second PE device using the primary PW, where the response packet is determined and obtained by the second PE device based on the first packet and the second packet, the second packet is forwarded by the third PE device and is received by the second PE device using the bypass PW, and the response packet is used to indicate that switching requests in the first packet and the second packet are accepted, and in addition, switching, by the first PE device based on the response packet, a preferential forwarding status of the first PE device relative to the primary PW from the active state of forwarding traffic to the balance state of forwarding traffic and a preferential forwarding status of the first PE device relative to the secondary PW from the standby state of not forwarding traffic to the balance state of forwarding traffic.

Based on the solution provided in this embodiment, in an operation process of the VPWS PW network, the first PE device may determine the primary PW and the secondary PW to be in the balance state by negotiating with the second PE device and the third PE device, thereby implementing traffic balancing between the primary PW and the secondary PW, and helping improve bandwidth utilization of the VPWS PW.

In a possible implementation of the first aspect, the method further includes receiving, by the first PE device, traffic from a first CE device, and in addition, forwarding, by the first PE device, the traffic from the first CE device to the second PE device and the third PE device in the traffic balancing manner using the primary PW and the secondary PW that are in the balance state.

In another possible implementation of the first aspect, before the sending, by the first PE device, a first packet to the second PE device using the primary PW, the method further includes determining, by the first PE device, that a bandwidth occupation rate at which the first PE device sends traffic to the second PE device exceeds a predetermined threshold.

Based on the foregoing implementations, the VPWS PW may automatically select from a redundancy mode or a traffic balancing mode based on a traffic forwarding bandwidth status for forwarding data traffic. Selection of the threshold is not limited. For example, a rated bandwidth of a PW is used as the threshold, or the threshold is configured by an operator.

In still another possible implementation of the first aspect, before sending, by the first PE device, a first packet to the second PE device using the primary PW, the method further includes determining, by the first PE device, that there is a predetermined time period from a time point at which the first PE device sends traffic to the second PE device.

Based on the foregoing implementation, after data traffic forwarded in the redundancy mode stabilizes, switching to the traffic balancing mode is performed to forward data traffic.

In yet another possible implementation of the first aspect, the method further includes determining, by the first PE device, that a fault detection packet from the second PE device cannot be received within a predetermined period, switching, by the first PE device, the preferential forwarding status of the first PE device relative to the primary PW from the balance state to the standby state, and sending a third packet to the second PE device, where the third packet is used to request to switch the primary PW from the balance state to the standby state, and in addition, switching, by the first PE device, the preferential forwarding status of the first PE device relative to the secondary PW from the balance state to the active state, and sending a fourth packet to the third PE device, where the fourth packet is used to request to switch the secondary PW from the balance state to the active state.

Based on the foregoing implementation, after determining that the primary PW or the second PE device is faulty, the first PE device switches a PW forwarding status to ensure successful service traffic forwarding, and avoid service interruption.

In still yet another possible implementation of the first aspect, the method further includes determining, by the first PE device, that a fault detection packet from the third PE device cannot be received within a predetermined period, switching, by the first PE device, the preferential forwarding status of the first PE device relative to the primary PW from the balance state to the active state, and sending a third packet to the second PE device, where the third packet is used to request to switch the primary PW from the balance state to the active state, and in addition, switching, by the first PE device, the preferential forwarding status of the first PE device relative to the secondary PW from the balance state to the standby state, and sending a fourth packet to the third PE device, where the fourth packet requests to switch the secondary PW from the balance state to the standby state.

Based on the foregoing implementation, after determining that the secondary PW or the third PE device is faulty, the first PE device switches a PW forwarding status to ensure successful service traffic forwarding, and avoid service interruption.

In a further possible implementation of the first aspect, the method further includes receiving, by the first PE device, termination packets from the second PE device and the third PE device, where the termination packets are used to instruct to terminate the balance state of the bypass PW, then switching, by the first PE device, the preferential forwarding status of the first PE device relative to the primary PW from the balance state to the active state, and sending a third packet to the second PE device, where the third packet is used to request to switch the primary PW from the balance state to the active state, and in addition, switching, by the first PE device, the preferential forwarding status of the first PE device relative to the secondary PW from the balance state to the standby state, and sending a fourth packet to the third PE device, where the fourth packet is used to request to switch the secondary PW from the balance state to the standby state.

Based on the foregoing implementation, after determining that the bypass PW is faulty, the first PE device switches a PW forwarding status to ensure successful service traffic forwarding, and avoid service interruption.

According to a second aspect, a packet forwarding method is provided. The method is applied to a VPWS PW redundancy network, and the VPWS PW redundancy network includes a first PE device, a second PE device, and a third PE device. A primary PW is set up between the first PE device and the second PE device, a secondary PW is set up between the first PE device and the third PE device, and a bypass PW is set up between the second PE device and the third PE device. The method includes receiving, by the second PE device, a first packet (the first packet is, for example, a PW status notification packet, and may be an LDP packet) from the first PE device using the primary PW, where the first packet is used to request to switch the primary PW from an active state of forwarding traffic to a balance state of forwarding traffic, and the balance state is used to instruct to forward traffic in a traffic balancing manner, in addition, receiving, by the second PE device using the bypass PW, a second packet (the second packet is, for example, a PW status notification packet, and may be an LDP packet) forwarded by the third PE device, where the second packet is used to request to switch the secondary PW from a standby state of not forwarding traffic to the balance state of forwarding traffic, then generating, by the second PE device, a response packet based on the first packet and the second packet, switching a preferential forwarding status of the second PE device relative to the primary PW from the active state of forwarding traffic to the balance state of forwarding traffic, and switching a preferential forwarding status of the second PE device relative to the bypass PW from a bypass state to the balance state, and in addition, sending, by the second PE device, the response packet to the first PE device using the primary PW, and sending the response packet to the third PE device using the bypass PW, where the response packet is used to indicate that switching requests in the first packet and the second packet are accepted.

Based on the solution provided in this embodiment, in an operation process of the VPWS PW network, the second PE device may determine the primary PW and the bypass PW to be in the balance state by negotiating with the first PE device and the third PE device, thereby implementing traffic balancing between the primary PW and the secondary PW, and helping improve bandwidth utilization of the VPWS PW.

In a possible implementation of the second aspect, a second CE device is connected to the second PE device and the third PE device in the VPWS PW redundancy network through dual homing using an MC-trunk link. A link between the CE device and the second PE device is a primary link, and a link between the CE device and the third PE device is a secondary link. The method further includes receiving, by the second PE device, traffic from the CE device using the primary link, and then forwarding, by the second PE device, the traffic from the CE device to the first PE device and the third PE device in the traffic balancing manner using the primary PW and the bypass PW that are in the balance state.

In another possible implementation of the second aspect, before generating, by the second PE device, a response packet based on the first packet and the second packet, switching a preferential forwarding status of the second PE device relative to the primary PW from the active state of forwarding traffic to the balance state of forwarding traffic, and switching a preferential forwarding status of the second PE device relative to the bypass PW from a bypass state to the balance state, the method further includes determining, by the second PE device, that a bandwidth occupation rate of an outbound interface over which the second PE device sends traffic to the third PE device is less than a predetermined threshold.

In still another possible implementation of the second aspect, before generating, by the second PE device, a response packet based on the first packet and the second packet, switching a preferential forwarding status of the second PE device relative to the primary PW from the active state of forwarding traffic to the balance state of forwarding traffic, and switching a preferential forwarding status of the second PE device relative to the bypass PW from a bypass state to the balance state, the method further includes determining, by the second PE device, that a bandwidth occupation rate of an outbound interface over which the second PE device sends traffic to the third PE device is greater than or equal to a predetermined threshold, generating, by the second PE device, a rejection packet, and sending the rejection packet to the first PE device using the primary PW and to the third PE device using the bypass PW, where the rejection packet is used to indicate that switching requests in the first packet and the second packet are rejected.

Based on the foregoing implementations, failed negotiations on a traffic balancing mode are reduced, and link congestion caused by switching to the traffic balancing mode is also reduced.

In yet another possible implementation of the second aspect, the method further includes determining, by the second PE device, that a fault detection packet from the first PE device cannot be received within a predetermined period, then switching, by the second PE device, the preferential forwarding status of the second PE device relative to the primary PW from the balance state to the standby state, and sending a fault notification packet to the first PE device, where the fault notification packet is used to notify a fault discovered by the second PE device to the first PE device, and in addition, switching, by the second PE device, the preferential forwarding status of the second PE device relative to the bypass PW from the balance state to the bypass state, and sending a termination packet to the third PE device, where the termination packet is used to instruct to terminate the balance state of the bypass PW.

Based on the foregoing implementation, after determining that the primary PW is faulty, the second PE device switches a PW forwarding status to ensure successful service traffic forwarding, and avoid service interruption.

In still yet another possible implementation of the second aspect, the method further includes determining, by the second PE device, that a fault detection packet from the CE device cannot be received within a predetermined period, and then determining, by the second PE device, that the preferential forwarding status of the second PE device relative to the primary PW is the balance state, maintaining the balance state relative to the primary PW, and skipping sending, to the first PE device, a packet used to switch the balance state of the primary PW.

Based on the foregoing implementation, after determining that a primary link in a remote AC side network is faulty, and determining that a PW forwarding status in a PW side network is the balance state, the second PE device maintains the balance state, to ensure successful service traffic forwarding, and avoid service interruption.

In a further possible implementation of the second aspect, the method further includes determining, by the second PE device, that a fault detection packet from the third PE device cannot be received within a predetermined period, then switching, by the second PE device, the preferential forwarding status of the second PE device relative to the bypass PW from the balance state to the bypass state, and sending a termination packet to the first PE device, where the termination packet is used to instruct to terminate the balance state of the bypass PW, receiving, by the second PE device, a third packet from the first PE device, where the third packet is used to request to switch the primary PW from the balance state to the active state, and in addition, switching, by the second PE device, the preferential forwarding status of the second PE device relative to the primary PW from the balance state to the active state based on the third packet.

Based on the foregoing implementation, after determining that the bypass PW or the third PE device is faulty, the second PE device switches a PW forwarding status to ensure successful service traffic forwarding, and avoid service interruption.

According to a third aspect, a packet forwarding method is provided. The method is applied to a VPWS PW redundancy network, and the VPWS PW redundancy network includes a first PE device, a second PE device, and a third PE device. A primary PW is set up between the first PE device and the second PE device, a secondary PW is set up between the first PE device and the third PE device, and a bypass PW is set up between the second PE device and the third PE device. The method includes receiving, by the third PE device, a first packet (the first packet is, for example, a PW status notification packet, and may be an LDP packet) from the first PE device using the secondary PW, where the first packet is used to request to switch the secondary PW from a standby state of not forwarding traffic to a balance state of forwarding traffic, then forwarding, by the third PE device, the first packet to the second PE device using the bypass PW, in addition, receiving, by the third PE device, a response packet from the second PE device using the bypass PW, where the response packet is used to indicate that a switching request in the first packet is accepted, and moreover, switching, by the third PE device based on the response packet, a preferential forwarding status of the third PE device relative to the secondary PW from the standby state of not forwarding traffic to the balance state of forwarding traffic, and switching a preferential forwarding status of the third PE device relative to the bypass PW from a bypass state to the balance state.

Based on the solution provided in this embodiment, in an operation process of the VPWS PW network, the third PE device may determine the secondary PW and the bypass PW to be in the balance state by negotiating with the first PE device and the second PE device, thereby implementing traffic balancing between the primary PW and the secondary PW, and helping improve bandwidth utilization of the VPWS PW.

In a possible implementation of the third aspect, before forwarding, by the third PE device, the first packet to the second PE device using the bypass PW, the method further includes determining, by the third PE device, that a bandwidth occupation rate of an outbound interface over which the third PE device sends traffic to the second PE device is less than a predetermined threshold.

In another possible implementation of the third aspect, before forwarding, by the third PE device, the first packet to the second PE device using the bypass PW, the method further includes determining, by the third PE device, that a bandwidth occupation rate of an outbound interface over which the third PE device sends traffic to the second PE device is greater than or equal to a predetermined threshold, generating, by the third PE device, a rejection packet, and sending the rejection packet to the first PE device using the secondary PW, where the rejection packet is used to indicate that a switching request in the second packet is rejected.

Based on the foregoing implementations, failed negotiations on a traffic balancing mode are reduced, and link congestion caused by switching to the traffic balancing mode is also reduced.

In still another possible implementation of the third aspect, the method further includes determining, by the third PE device, that a fault detection packet from the first PE device cannot be received within a predetermined period, then switching, by the third PE device, the preferential forwarding status of the third PE device relative to the secondary PW from the balance state to the standby state, and sending a fault notification packet to the first PE device, where the fault notification packet is used to notify a fault discovered by the third PE device to the first PE device, and in addition, switching, by the third PE device, the preferential forwarding status of the third PE device relative to the bypass PW from the balance state to the bypass state, and sending a termination packet to the second PE device, where the termination packet is used to instruct to terminate the balance state of the bypass PW.

Based on the foregoing implementation, after determining that the secondary PW is faulty, the third PE device switches a PW forwarding status to ensure successful service traffic forwarding, and avoid service interruption.

In yet another possible implementation of the third aspect, the method further includes determining, by the third PE device, that a fault detection packet from the second PE device cannot be received within a predetermined period, then switching, by the third PE device, the preferential forwarding status of the third PE device relative to the bypass PW from the balance state to the bypass state, and sending a termination packet to the first PE device, where the termination packet is used to instruct to terminate the balance state of the bypass PW, receiving, by the third PE device, a second packet from the first PE device, where the second packet is used to request to switch the secondary PW from the balance state to the active state or the standby state, and then switching, by the third PE device, the preferential forwarding status of the third PE device relative to the secondary PW from the balance state to the active state or the standby state based on the second packet.

Based on the foregoing implementation, after determining that the bypass PW or the second PE device is faulty, the third PE device switches a PW forwarding status to ensure successful service traffic forwarding, and avoid service interruption.

According to a fourth aspect, a first PE device is provided. The first PE device has a function of implementing the behavior of the first PE device in the foregoing method. The function may be implemented based on hardware, or may be implemented based on hardware executing corresponding software. The hardware or software includes one or more modules corresponding to the foregoing function.

In a possible design, a structure of the first PE device includes a processor and an interface, and the processor is configured to support the first PE device in performing the corresponding function in the foregoing method. The interface is configured to support the first PE device in communicating with the second PE device and the third PE device, and sending information or instructions in the foregoing method to the second PE device and the third PE device, or receiving information or instructions in the foregoing method from the second PE device and the third PE device. The first PE device may further include a memory. The memory is configured to be coupled to the processor, and store a program instruction and data that are necessary for the first PE device.

According to a fifth aspect, a second PE device is provided. The second PE device has a function of implementing the behavior of the second PE device in the foregoing method. The function may be implemented based on hardware, or may be implemented based on hardware executing corresponding software. The hardware or software includes one or more modules corresponding to the foregoing function.

In a possible design, a structure of the second PE device includes a processor and an interface, and the processor is configured to support the second PE device in performing the corresponding function in the foregoing method. The interface is configured to support the second PE device in communicating with the first PE device and the third PE device, and sending information or instructions in the foregoing method to the first PE device and the third PE device, or receiving information or instructions in the foregoing method from the first PE device and the third PE device. The second PE device may further include a memory. The memory is configured to be coupled to the processor, and store a program instruction and data that are necessary for the second PE device.

According to a sixth aspect, a third PE device is provided. The third PE device has a function of implementing the behavior of the third PE device in the foregoing method. The function may be implemented based on hardware, or may be implemented based on hardware executing corresponding software. The hardware or software includes one or more modules corresponding to the foregoing function.

In a possible design, a structure of the third PE device includes a processor and an interface, and the processor is configured to support the third PE device in performing the corresponding function in the foregoing method. The interface is configured to support the third PE device in communicating with the first PE device and the second PE device, and sending information or instructions in the foregoing method to the first PE device and the second PE device, or receiving information or instructions in the foregoing method from the first PE device and the second PE device. The third PE device may further include a memory. The memory is configured to be coupled to the processor, and store a program instruction and data that are necessary for the third PE device.

In the first aspect, the second aspect, the third aspect, the fourth aspect, the fifth aspect, and the sixth aspect, optionally, the first packet and the second packet each carry PW status code, and the PW status code is used to indicate that a PW status is the balance state.

According to a seventh aspect, a VPWS PW redundancy network system is provided. The system includes the first PE device described in the fourth aspect, the second PE device described in the fifth aspect, and the third PE device described in the sixth aspect.

According to an eighth aspect, a computer storage medium is provided, and is configured to store programs, code, or instructions used by the first PE device. When a processor or a hardware device executes these programs, code, or instructions, functions or steps of the first PE device in the foregoing aspects may be implemented.

According to a ninth aspect, a computer storage medium is provided, and is configured to store programs, code, or instructions used by the second PE device. When a processor or a hardware device executes these programs, code, or instructions, functions or steps of the second PE device in the foregoing aspects may be implemented.

According to a tenth aspect, a computer storage medium is provided, and is configured to store programs, code, or instructions used by the third PE device. When a processor or a hardware device executes these programs, code, or instructions, functions or steps of the third PE device in the foregoing aspects may be implemented.

Based on the foregoing solutions, in the packet forwarding method, the device, and the system that are provided in the embodiments of this application, the first PE device sends, to the second PE device and the third PE device respectively using the primary PW and the secondary PW, request packets requesting to switch to the balance state, the second PE device receives the two request packets using the primary PW and using the secondary PW, the third PE device, and the bypass PW, the second PE device switches the preferential forwarding statuses of the second PE device relative to the primary PW and the bypass PW to the balance state, and notifies the first PE device and the third PE device using the response packet, and the first PE device switches the preferential forwarding statuses of the first PE device relative to the primary PW and the secondary PW to the balance state based on the response packet, and the third PE device switches the preferential forwarding status of the third PE device relative to the bypass PW to the balance state based on the response packet. Therefore, traffic balancing between the primary PW and the secondary PW is implemented when the redundancy protection functions of the primary PW and the secondary PW in the VPWS PW are reserved, thereby helping improve bandwidth utilization of the VPWS PW.

BRIEF DESCRIPTION OF DRAWINGS

FIG. 3A and FIG. 3B are a flowchart of a packet forwarding method according to an embodiment of this application;

FIG. 5A and FIG. 5B are a flowchart of a fault processing method according to an embodiment of this application;

FIG. 6A and FIG. 6B are a flowchart of another fault processing method according to an embodiment of this application;

FIG. 10A and FIG. 10B are a flowchart of a further fault processing method according to an embodiment of this application;

DESCRIPTION OF EMBODIMENTS

The embodiments of this application provide a packet forwarding method, a device, and a system to help improve bandwidth utilization of a VPWS PW when redundancy protection functions of a primary PW and a secondary PW in the VPWS PW are reserved.

The following separately provides detailed descriptions using specific embodiments.

To make the inventive objectives, features, and advantages of this application clearer and more comprehensible, the following clearly describes the technical solutions in the embodiments of this application with reference to the accompanying drawings in the embodiments of this application. The described embodiments are merely some but not all of the embodiments of this application. Based on the embodiments of this application, a person of ordinary skill in the art may obtain other embodiments.

In the specification, claims, and accompanying drawings of this application, the terms "first", "second", "third", "fourth" and so on are intended to distinguish between different objects but do not indicate a particular order. In addition, the terms "include" and "have" are not exclusive. For example, a process, a method, a system, a product, or a device including a series of steps or units is not limited to the listed steps or units, and may further include steps or units that are not listed.

Figure 1:
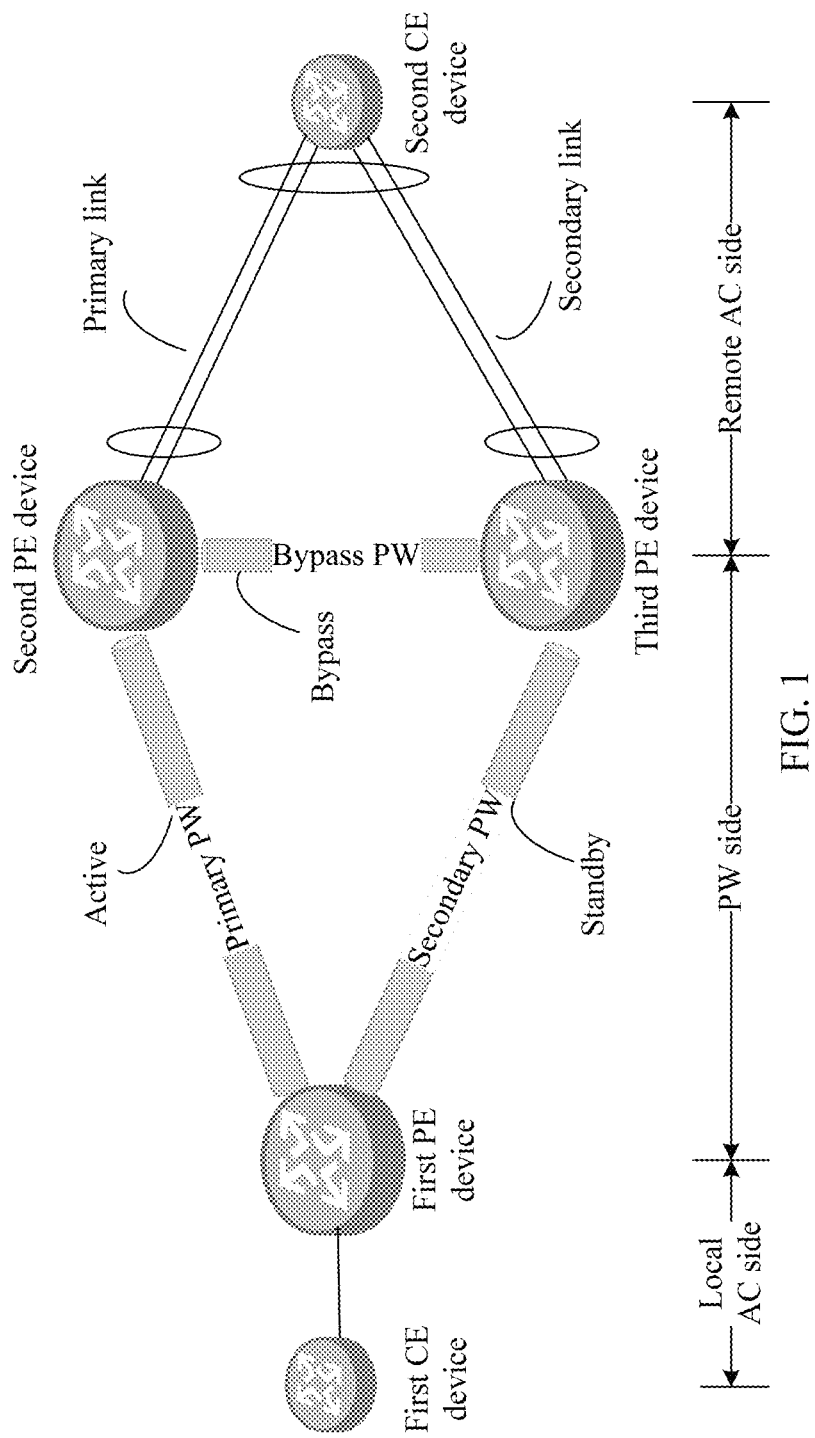
FIG. 1 is a schematic structural diagram of a VPWS PW redundancy network according to an embodiment of this application.

FIG. 1 is a schematic structural diagram of a VPWS PW redundancy network according to an embodiment of this application. The VPWS PW redundancy network includes a first PE device, a second PE device, and a third PE device. The first PE device separately communicates with the second PE device and the third PE device using communications links. A PW redundancy group is set up between the first PE device and the second PE device and the third PE device, and the PW redundancy group includes a primary PW and a secondary PW. The primary PW is set up between the first PE device and the second PE device, and the secondary PW is set up between the first PE device and the third PE device. A process of setting up the primary PW and the secondary PW may be implemented according to the corresponding standard formulated by the Internet Engineering Task Force (IETF), for example, the Requirement For Comments (RFC) 6718, and details are not described in this application. In addition, a bypass PW is set up between the second PE device and the third PE device. The bypass PW may use an inter-chassis backup (ICB) PW or a dual node interconnection (DNI) PW. In this way, in the VPWS PW redundancy network, a network including the first PE device, the second PE device, and the third PE device may be referred to as a PW side network.

The first PE device communicates with a first CE device using a communications link. The first CE device may send data traffic to the PW redundancy group using the first PE device, or may receive data traffic from the PW redundancy group using the first PE device. The communications link between the first CE device and the first PE device may be a physical link, or may be an aggregated link: an Ethernet trunk (Eth-Trunk) link, formed by a plurality of physical links. In this way, in the VPWS PW redundancy network, a network including the first PE device and the first CE device may be referred to as a local AC side network.

A second CE device is connected to the second PE device and the third PE device in the VPWS PW redundancy network through dual homing using an aggregated link: a multi-chassis trunk (MC-Trunk) link. The MC-trunk link may also be referred to as an enhanced trunk (E-trunk) link. Further, the MC-trunk link includes two member Eth-trunk links. One Eth-trunk link is disposed between the second CE device and the second PE device, and the other Eth-trunk link is disposed between the second CE device and the third PE device. In the MC-trunk link, primary and secondary states of the two member Eth-trunk links need to be configured. As shown in FIG. 1, the Eth-trunk link between the second CE device and the second PE device is determined as a primary link, or referred to as a primary Eth-trunk link, and the Eth-trunk link between the second CE device and the third PE device is determined as a secondary link, or referred to as a secondary Eth-trunk link. In this way, in the VPWS PW redundancy network, a network including the second PE device, the third PE device, and the second CE device may be referred to as a remote AC side network.

In the VPWS PW redundancy network shown in FIG. 1, a CE device may be a switch or a router, and a PE device may be a router or a layer 3 switch. The VPWS PW redundancy network shown in FIG. 1 may be applied to a plurality of scenarios. For example, the VPWS PW redundancy network is applied to a mobile bearer network, and a typical mobile bearer network is an Internet protocol (IP) radio access network (RAN). In the mobile bearer network, the first CE device may be a base transceiver station (BTS), the second CE device may be a base station controller (BSC) or a radio network controller (RNC), the first PE device may be a cell site gateway (CSG), and the second PE device and the third PE device may be RNC site gateways (RSG). For another example, the VPWS PW redundancy network is applied to a fixed network. In the fixed network, the first CE device and the second CE device may be user side sites, the sites may be located in a virtual private network (VPN), the first PE device may be a digital subscriber line (DSL) access multiplexer (DSLAM), and the second PE device and the third PE device may be broadband access servers (BAS).

In FIG. 1, a VPWS PW redundancy protection mechanism may use two working modes a master/slave mode and an independent mode. The two working modes are separately described below.

For the master/slave mode, in the PW side network, the first PE device determines that a preferential forwarding status of the first PE device relative to the primary PW is an active state, and sends a PW status notification packet carrying active state code to the second PE device. The preferential forwarding status is used to indicate a PW forwarding status determined by a PE device. The active state code is used to indicate that a PW is in an active state of forwarding traffic. For example, a value of the active state code is set to 0x00 (0x represents a hexadecimal system) according to RFC 4447 or RFC 6870 formulated by the IETF. After receiving the PW status notification packet carrying the active state code, the second PE device determines that a preferential forwarding status of the second PE device relative to the primary PW is the active state, and returns a PW status notification packet carrying the active state code to the first PE device. In this way, the first PE device and the second PE device both determine that the preferential forwarding statuses of the first PE device and the second PE device relative to the primary PW are the active state, and the preferential forwarding statuses of two ends of the primary PW are the same. Therefore, the primary PW is determined to be in the active state. In addition, the first PE device determines that a preferential forwarding status of the first PE device relative to the secondary PW is a standby state, and sends a PW status notification packet carrying standby state code to the third PE device. The standby state code is used to indicate that a PW is in a standby state of not forwarding traffic. For example, a value of the standby state code is set to 0x20 according to RFC 4447 or RFC 6870 formulated by the IETF. After receiving the PW status notification packet carrying the standby state code, the third PE device determines that a preferential forwarding status of the third PE device relative to the secondary PW is the standby state, and returns a PW status notification packet carrying the standby state code to the first PE device. In this way, the first PE device and the third PE device both determine that the preferential forwarding statuses of the first PE device and the third PE device relative to the secondary PW are the standby state, and the preferential forwarding statuses of two ends of the secondary PW are the same. Therefore, the secondary PW is determined to be in the standby state. The PW status notification packet may be an LDP packet. In the remote AC side network, the second CE device and the second PE device negotiate with each other using a Link Aggregation Control Protocol (LACP) packet to determine the Eth-trunk link between the second CE device and the second PE device as the primary link. The second CE device and the third PE device negotiate with each other using an LACP packet, to determine the Eth-trunk link between the second CE device and the third PE device as the secondary link. In the master/slave mode, negotiation processes in the PW side network and the remote AC side network are separate from each other. Using the foregoing negotiation processes, the first CE device and the second CE device may forward data traffic to each other using the primary PW and the primary link, and a data traffic forwarding path is the first CE device—the first PE device—the primary PW—the second PE device—the primary link—the second CE device.

For the independent mode, a PW status in the PW side network is determined jointly by a status of an Eth-trunk link in the remote AC side network and PW status notification packets exchanged in the PW side network. Further, the Eth-trunk link between the second CE device and the second PE device is determined as the primary link through negotiation, and the Eth-trunk link between the second CE device and the third PE device is determined as the secondary link through negotiation. The first PE device determines that a local preferential forwarding status is an active state, and separately sends a PW status notification packet carrying active state code to the second PE device and the third PE device. Because the Eth-trunk link between the second CE device and the second PE device is determined as the primary link through negotiation, a local preferential forwarding status determined by the second PE device is the active state. The second PE device determines, through comparison, that the active state code in the PW status notification packet and the local preferential forwarding status match each other, and both are the active state. Therefore, the second PE device determines that a preferential forwarding status of the second PE device relative to the primary PW is the active state, and sends a PW status notification packet carrying the active state code to the first PE device. In addition, because the Eth-trunk link between the second CE device and the third PE device is determined as the secondary link through negotiation, a local preferential forwarding status determined by the third PE device is a standby state. The third PE device determines, through comparison, that the active state code in the PW status notification packet does not match the local preferential forwarding status. Therefore, the third PE device determines that a preferential forwarding status of the third PE device relative to the secondary PW is the standby state, and sends a PW status notification packet carrying standby state code to the first PE device. The first PE device determines, through comparison based on the received PW status notification packet carrying the active state code, that the active state code in the PW status notification packet and the local preferential forwarding status match each other, and both are the active state. Therefore, the first PE device determines that a preferential forwarding status of the first PE device relative to the primary PW is the active state. Therefore, the primary PW is determined to be in the active state. Correspondingly, the first PE device determines, through comparison based on the received PW status notification packet carrying the standby state code, that the standby state code in the PW status notification packet does not match the local preferential forwarding status. Therefore, the first PE device determines that a preferential forwarding status of the first PE device relative to the secondary PW is the standby state. Therefore, the secondary PW is determined to be in the standby state. Using the foregoing negotiation processes, the first CE device and the second CE device may forward data traffic to each other using the primary PW and the primary link, and a data traffic forwarding path is the first CE device—the first PE device—the primary PW—the second PE device—the primary link—the second CE device. The PW status notification packet may be an LDP packet.

In the foregoing two working modes, only one PW is used to forward data traffic at any time. In an actual application scenario, alternatively, a plurality of PWs may be disposed or a plurality of tunnels are carried in one PW. For example, two PWs are disposed between the first PE device and the second PE device, one is a primary PW, and the other is a secondary PW. Correspondingly, two PWs are disposed between the first PE device and the third PE device, one is a primary PW, and the other is a secondary PW. Using such a setting, the first PE device can transmit data traffic to the second PE device and the third PE device at the same time based on different PW redundancy groups. For another example, one PW is disposed between the first PE device and the second PE device, and the PW includes a plurality of tunnels. Correspondingly, one PW is disposed between the first PE device and the third PE device, and the PW includes a plurality of tunnels. Using such a setting, the first PE device can transmit data traffic to the second PE device and the third PE device at the same time based on different tunnel redundancy groups. However, for the foregoing implementation, two PWs in each PW redundancy group or two tunnels in each tunnel redundancy group need one to be primary and the other secondary such that only one PW or one tunnel is used to forward data traffic at any time. Consequently, real traffic balancing cannot be implemented.

The embodiments of this application provide a packet forwarding method, to implement a traffic balancing function when redundancy protection functions of a primary PW and a secondary PW in a VPWS PW are reserved, and improve bandwidth utilization of the VPWS PW. In this application, traffic balancing may also be referred to as load sharing. Unless otherwise specially specified, traffic balancing is equivalent to load sharing.

Figure 2:
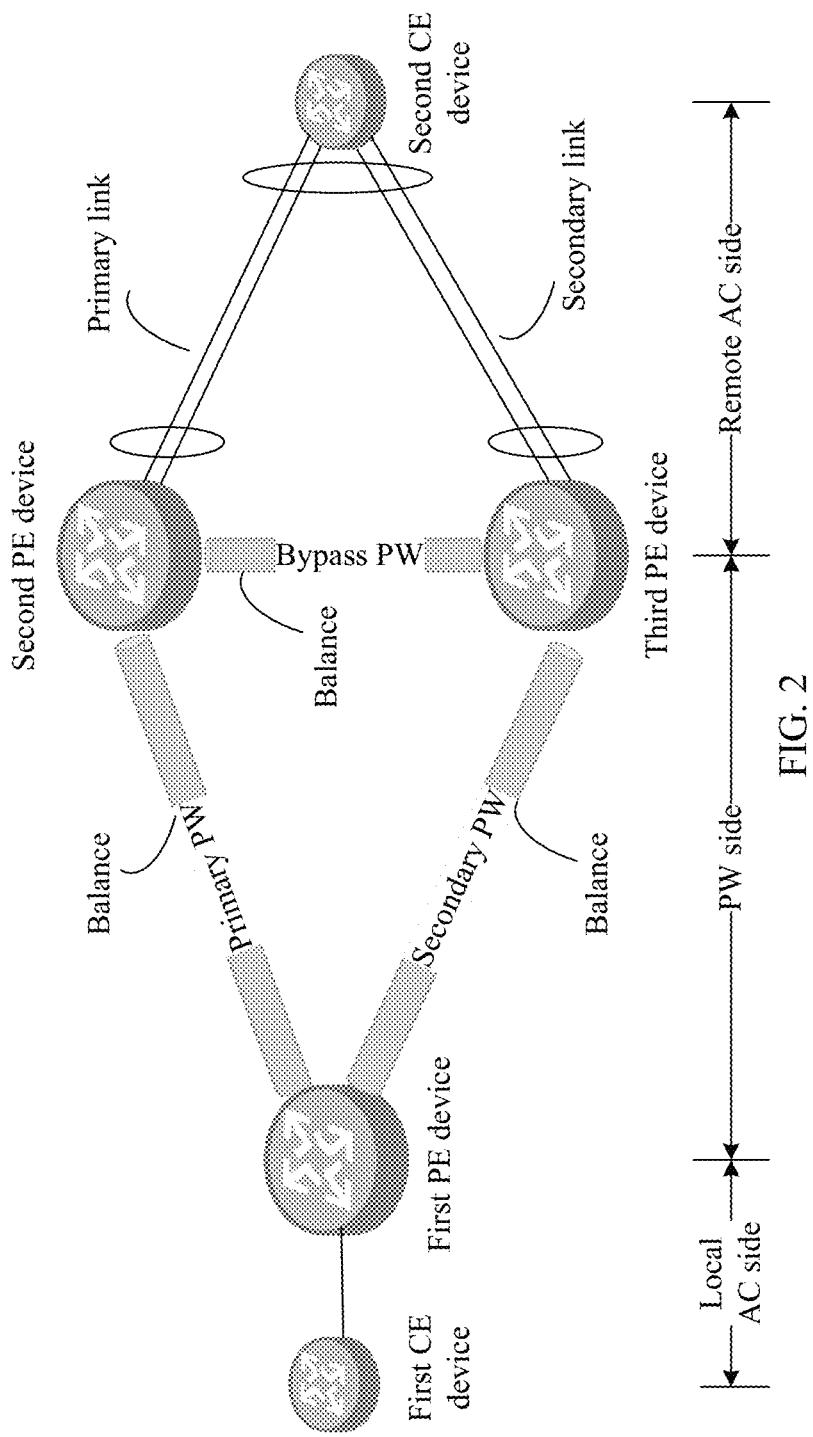
FIG. 2 is a schematic structural diagram of another VPWS PW redundancy network according to an embodiment of this application.
Figure 3A:
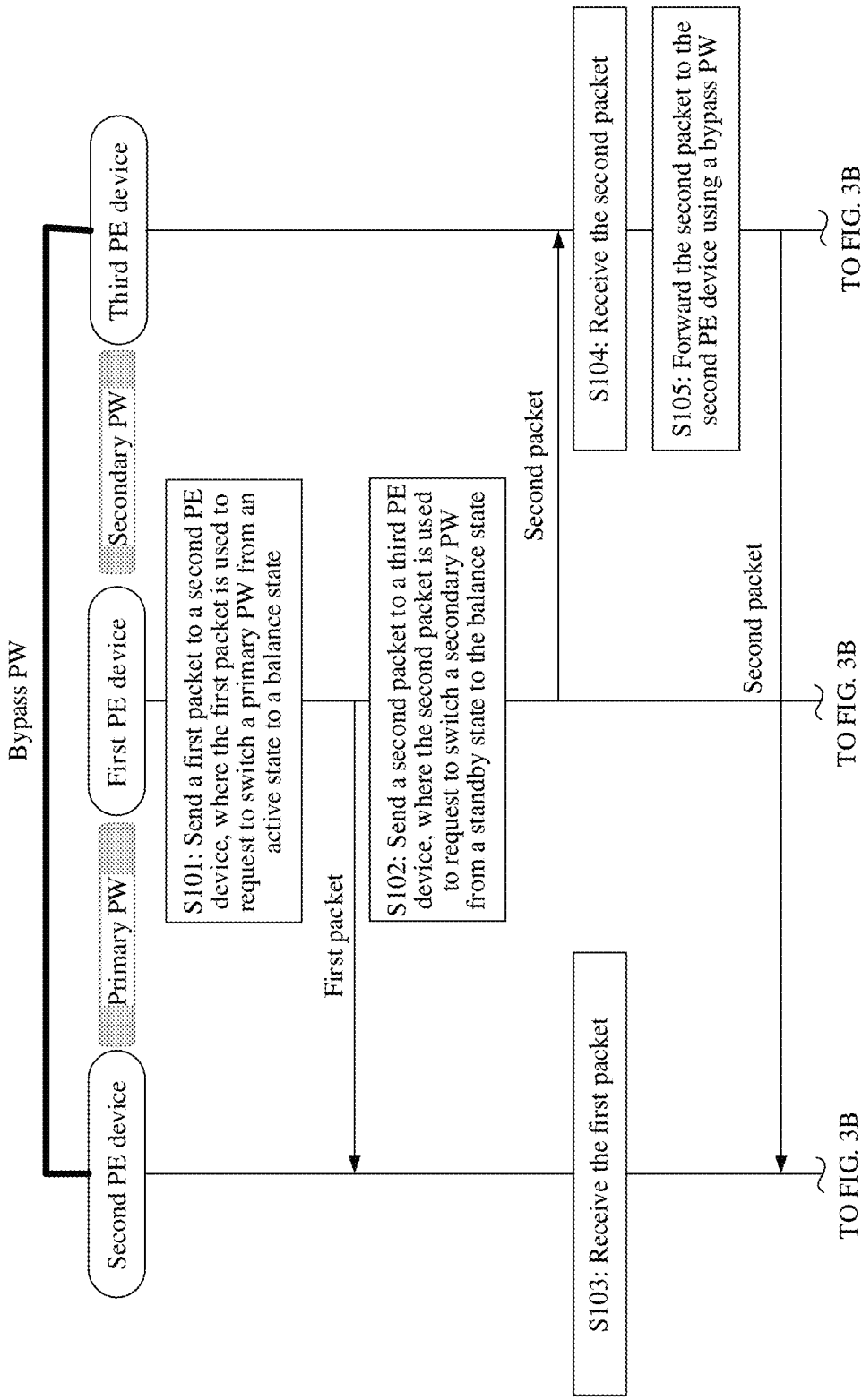

FIG. 3A and FIG. 3B are a flowchart of a packet forwarding method according to an embodiment of this application. The method shown in FIG. 3A and FIG. 3B may be applied to the VPWS PW redundancy network shown in FIG. 1 and FIG. 2. The VPWS PW redundancy network includes a first PE device, a second PE device, and a third PE device, a primary PW is set up between the first PE device and the second PE device, a secondary PW is set up between the first PE device and the third PE device, and a bypass PW is set up between the second PE device and the third PE device. Further, in forwarding statuses in the VPWS PW redundancy network shown in FIG. 1, the method shown in FIG. 3A and FIG. 3B is used to switch the forwarding statuses in the VPWS PW redundancy network to a forwarding status shown in FIG. 2. The method includes the following steps:

Step S101: The first PE device sends a first packet to the second PE device, where the first packet is used to request to switch the primary PW from an active state to a balance state.

Step S102: The first PE device sends a second packet to the third PE device, where the second packet is used to request to switch the secondary PW from a standby state to the balance state.

According to the description of the scenario shown in FIG. 1 in the foregoing embodiment, through the negotiation processes, a first CE device and a second CE device may forward data traffic to each other using the primary PW and a primary link, and a data traffic forwarding path is the first CE device—the first PE device—the primary PW—the second PE device—the primary link—the second CE device. To be specific, a status of the primary PW is the active state of forwarding data traffic, and a status of the secondary PW is the standby state of not forwarding data traffic.

The first PE device sends the first packet to the second PE device using the primary PW. The first packet is used to request to switch the primary PW from the active state to the balance state, and the balance state is used to instruct to forward data traffic in a traffic balancing manner. Optionally, the first packet is a PW status notification packet carrying balance state code. The balance state code is used to indicate that a PW is in the balance state of forwarding traffic. Because a current status of the primary PW is the active state, the balance state code may be considered as instructing to switch the primary PW from the active state to the balance state. The PW status notification packet may be an LDP packet. A value of the balance state code may be set to, for example, 0x30.

Based on the same manner, the first PE device further sends the second packet to the third PE device using the secondary PW. The second packet is used to request to switch the secondary PW from the standby state to the balance state, and the balance state is used to instruct to forward data traffic in the traffic balancing manner. Optionally, the second packet is a PW status notification packet carrying the balance state code. The balance state code is used to indicate that a PW is in the balance state of forwarding traffic. Because a current status of the secondary PW is the standby state, the balance state code may be considered as instructing to switch the secondary PW from the standby state to the balance state. The PW status notification packet may be an LDP packet. A value of the balance state code may be set to, for example, 0x30.

This embodiment imposes no limitation on an execution sequence of steps S101 and S102. It should be understood that step S101 may be performed before step S102, step S101 may be performed after step S102, or steps S101 and S102 may be simultaneously performed.

Step S103: The second PE device receives the first packet.

Step S104: The third PE device receives the second packet.

For example, the second PE device receives, using the primary PW, the PW status notification packet that is from the first PE device and that carries the balance state code. The third PE device receives, using the secondary PW, the PW status notification packet that is from the first PE device and that carries the balance state code.

Step S105: The third PE device forwards the second packet to the second PE device using the bypass PW.

Step S106: The second PE device receives the second packet.

For example, after receiving the PW status notification packet that is from the first PE device and that carries the balance state code, the third PE device forwards the PW status notification packet to the second PE device using the bypass PW between the second PE device and the third PE device. Correspondingly, the second PE device receives the PW status notification packet using the bypass PW.

Step S107: The second PE device generates a response packet based on the first packet and the second packet, switches a preferential forwarding status of the second PE device relative to the primary PW from the active state to the balance state, and switches a preferential forwarding status of the second PE device relative to the bypass PW from a bypass state to the balance state.

For example, after receiving the two PW status notification packets carrying the balance state code, the second PE device determines that the two PW status notification packets each carry the balance state code, and generates the response packet. The response packet indicates that switching requests in the two PW status notification packets are accepted. In the two PW status notification packets, one PW status notification packet is sent by the first PE device using the primary PW, and the other PW status notification packet is sent by the first PE device using the secondary PW, the third PE device, and the bypass PW. The second PE device further switches the preferential forwarding status of the second PE device relative to the primary PW from the active state to the balance state and switches the preferential forwarding status of the second PE device relative to the bypass PW from the bypass state to the balance state. A beneficial effect of switching, by the second PE device, the preferential forwarding status of the second PE device relative to the bypass PW to the balance state is After data traffic sent by the second CE device to the first CE device reaches the second PE device through the primary link in a remote AC side network, the second PE device may transmit the data traffic using the primary PW and the bypass PW in a balancing manner.

Step S108: The second PE device sends the response packet to the first PE device using the primary PW, and sends the response packet to the third PE device using the bypass PW, where the response packet is used to indicate that switching requests in the first packet and the second packet are accepted.

For example, the response packet may be a PW status notification packet carrying the balance state code, and the PW status notification packet may be an LDP packet. The second PE device may replicate the response packet into two copies, or directly generate two response packets, to obtain two PW status notification packets carrying the balance state code. Therefore, the second PE device sends the response packet to the first PE device using the primary PW and sends the response packet to the third PE device using the bypass PW.

Step S109: The first PE device receives the response packet.

Step S110: The first PE device switches, based on the response packet, a preferential forwarding status of the first PE device relative to the primary PW from the active state to the balance state and a preferential forwarding status of the first PE device relative to the secondary PW from the standby state to the balance state.

Further, when the first PE device receives the response packet, the first PE device can determine that the second PE device has received the first packet that is sent by the first PE device using the primary PW and the second packet that is sent by the first PE device using the secondary PW and the bypass PW, and that the second PE device has switched the preferential forwarding status of the second PE device relative to the primary PW and the preferential forwarding status of the second PE device relative to the bypass PW to the balance state. Therefore, the first PE device may switch, based on the response packet, the preferential forwarding status of the first PE device relative to the primary PW from the active state to the balance state and the preferential forwarding status of the first PE device relative to the secondary PW from the standby state to the balance state. With reference to the descriptions of step S107, the second PE device has switched the preferential forwarding status of the second PE device relative to the primary PW from the active state to the balance state. Because devices at both ends of the primary PW switch the preferential forwarding statuses of the devices relative to the primary PW to the balance state, the primary PW is determined to be in the balance state, thereby completing corresponding switching.

Step S111: The third PE device receives the response packet.

Step S112: The third PE device switches, based on the response packet, a preferential forwarding status of the third PE device relative to the secondary PW from the standby state to the balance state and a preferential forwarding status of the third PE device relative to the bypass PW from the bypass state to the balance state.

Further, when the third PE device receives the response packet, the third PE device can determine that the second PE device has received the first packet that is sent by the first PE device using the primary PW and the second packet that is sent by the first PE device using the secondary PW and the bypass PW, and that the second PE device has switched the preferential forwarding status of the second PE device relative to the primary PW and the preferential forwarding status of the second PE device relative to the bypass PW to the balance state. Therefore, the third PE device may switch, based on the response packet, the preferential forwarding status of the third PE device relative to the secondary PW from the standby state to the balance state and the preferential forwarding status of the third PE device relative to the bypass PW from the bypass state to the balance state. With reference to the descriptions of steps S107 and S110, the second PE device has switched the preferential forwarding status of the second PE device relative to the bypass PW from the bypass state to the balance state and the first PE device has switched the preferential forwarding status of the first PE device relative to the secondary PW from the standby state to the balance state. Therefore, the secondary PW and the bypass PW are determined to be in the balance state, thereby completing corresponding switching.

After negotiation processes in step S101 to step S112 are completed, the forwarding status in the VPWS PW redundancy network is shown in FIG. 2. In this way, the first PE device may perform traffic balancing calculation on the data traffic from the first CE device based on a hash algorithm. The first PE device sends a part of the data traffic to the second PE device using the primary PW, and the part of the data traffic reaches the second CE device through a primary link. The first PE device further sends the other part of the data traffic to the third PE device using the secondary PW, and the part of the data traffic reaches the second CE device through the bypass PW, the second PE device, and the primary link. Likewise, after the data traffic sent by the second CE device reaches the second PE device through the primary link, the second PE device may perform traffic balancing calculation on the data traffic based on the hash algorithm. A part of the traffic reaches the first PE device through the primary PW, and the other part of the traffic reaches the first PE device through the bypass PW, the third PE device, and the secondary PW. This application imposes no limitation on a calculation rule used for traffic balancing calculation. For example, the traffic may be evenly allocated, or may be allocated based on bandwidth of two PWs, or may be allocated based on a service type of the traffic.

Based on the foregoing implementation, the first PE device sends, to the second PE device and the third PE device respectively using the primary PW and the secondary PW, the request packets requesting to switch to the balance state, the second PE device receives the two request packets using the primary PW and using the secondary PW, the third PE device, and the bypass PW, the second PE device switches the preferential forwarding statuses of the second PE device relative to the primary PW and the bypass PW to the balance state, and notifies the first PE device and the third PE device using the response packet, the first PE device switches the preferential forwarding statuses of the first PE device relative to the primary PW and the secondary PW to the balance state based on the response packet, and the third PE device switches the preferential forwarding status of the third PE device relative to the bypass PW to the balance state based on the response packet. Therefore, traffic balancing between the primary PW and the secondary PW is implemented when redundancy protection functions of the primary PW and the secondary PW in the VPWS PW are reserved, thereby helping improve bandwidth utilization of the VPWS PW.

Optionally, the first packet and the second packet each carry PW status code, and the PW status code is used to indicate that a PW status is the balance state.

For example, the first packet and the second packet may be LDP packets, the LPD packets each carry the PW status code, the PW status code may be the balance state code, and a value of the balance state code may be set to, for example, 0x30.

Optionally, before step S101, the method further includes determining, by the first PE device, that a bandwidth occupation rate at which the first PE device sends traffic to the second PE device exceeds a predetermined threshold.

For example, before step S101 is performed, a PW forwarding manner of the VPWS PW is determined, through negotiation, as the scenario shown in FIG. 1. In addition, data traffic is forwarded using the primary PW in the active state, and the secondary PW is in the standby state. The first PE device may periodically detect a bandwidth occupation rate of an outbound interface of the first PE device, and the outbound interface is used to connect to the primary PW. To be specific, the first PE device periodically detects traffic sent to the primary PW in the active state. When the bandwidth occupation rate exceeds the predetermined threshold, it indicates that the primary PW may be in overloaded operation or that congestion may occur. When the bandwidth occupation rate exceeds the predetermined threshold, the first PE device triggers performing of step S101, that is, triggers the procedure shown in FIG. 3A and FIG. 3B. Based on the foregoing implementation, the VPWS PW may automatically select from a redundancy mode or a traffic balancing mode based on a traffic forwarding bandwidth status for forwarding data traffic. Selection of the threshold is not limited. For example, a rated bandwidth of a PW is used as the threshold, or the threshold is configured by an operator.

Optionally, before step S101, the method further includes determining, by the first PE device, that there is a predetermined time period from a time point at which the first PE device sends traffic to the second PE device.

For example, before step S101 is performed, a PW forwarding manner of the VPWS PW is determined, through negotiation, as the scenario shown in FIG. 1. In addition, data traffic is forwarded using the active primary PW, and the secondary PW is in the standby state. After the predetermined time period from the time point at which the first PE device sends traffic to the second PE device, the first PE device triggers performing of step S101, that is, triggers the procedure shown in FIG. 3A and FIG. 3B. Based on the foregoing implementation, after data traffic forwarded in the redundancy mode stabilizes, switching to the traffic balancing mode is performed, to forward data traffic.

Optionally, before step S107, the method further includes determining, by the second PE device, that a bandwidth occupation rate of an outbound interface over which the second PE device sends traffic to the third PE device is less than a predetermined threshold.

A PW link is carried on a physical link. Therefore, the physical link may be further used to transmit non-PW traffic. The non-PW traffic is traffic that is transmitted without using a PW link but using a physical link carrying the PW link. A total bandwidth of the physical link is fixed. If the non-PW traffic on the physical link occupies an excessively high bandwidth, a bandwidth of the PW link carried on the physical link is reduced. As a result, even if there is no traffic on the PW link, the PW link may be congested or may have poor communication quality due to overloading of the non-PW traffic on the physical link. Before generating the response packet based on the first packet and the second packet, the second PE device detects traffic sent by the second PE device to a physical link between the second PE device and the third PE device. To be specific, the second PE device detects the bandwidth occupation rate of the outbound interface over which the second PE device sends traffic to the third PE device. When the bandwidth occupation rate of the outbound interface is less than the predetermined threshold, it indicates that there is a remaining bandwidth that is on the bypass PW carried on the physical link between the second PE device and the third PE device and that may be used to carry PW traffic. Based on the foregoing implementations, failed negotiations on a traffic balancing mode are reduced, and link congestion caused by switching to the traffic balancing mode is also reduced.

Optionally, before step S107, the method further includes determining, by the second PE device, that a bandwidth occupation rate of an outbound interface over which the second PE device sends traffic to the third PE device is greater than or equal to a predetermined threshold, generating, by the second PE device, a rejection packet, and sending the rejection packet to the first PE device using the primary PW and to the third PE device using the bypass PW, where the rejection packet is used to indicate that the switching requests in the first packet and the second packet are rejected.

With reference to the foregoing descriptions, when the bandwidth occupation rate of the outbound interface of the second PE device is greater than or equal to the predetermined threshold, the rejection packet is generated, and the rejection packet is notified to the first PE device and the third PE device. After receiving the rejection packet, the first PE device and the third PE device terminate a negotiation process of switching to the traffic balancing mode. Optionally, the rejection packet is a PW status notification packet carrying rejection state code, and the PW status notification packet may be an LDP packet. A value of the rejection state code may be set to, for example, 0x31.

Correspondingly, after the step is triggered, corresponding steps in step S107 to step S112 are not performed in the method shown in FIG. 3A and FIG. 3B.

Optionally, before step S105, the method further includes determining, by the third PE device, that a bandwidth occupation rate of an outbound interface over which the third PE device sends traffic to the second PE device is less than a predetermined threshold.

Optionally, before step S105, the method further includes determining, by the third PE device, that a bandwidth occupation rate of an outbound interface over which the third PE device sends traffic to the second PE device is greater than or equal to a predetermined threshold, generating, by the third PE device, a rejection packet, and sending the rejection packet to the first PE device using the secondary PW, where the rejection packet is used to indicate that the switching request in the second packet is rejected.

Based on the foregoing descriptions, based on an implementation the same as the implementation in which the second PE device detects the bandwidth occupation rate of the outbound interface, after receiving the second packet sent by the first PE device using the secondary PW, the third PE device detects whether the bandwidth occupation rate of the outbound interface over which the third PE device sends traffic to the second PE device is less than the predetermined threshold. If the third PE device determines that the bandwidth occupation rate of the outbound interface over which the third PE device sends traffic to the second PE device is less than the predetermined threshold, the step S105 is performed. If the third PE device determines that the bandwidth occupation rate of the outbound interface over which the third PE device sends traffic to the second PE device is greater than or equal to the predetermined threshold, the third PE device generates the rejection packet, and sends the rejection packet to the first PE device using the secondary PW. Correspondingly, corresponding steps in step S105 to step S112 are not performed in the method shown in FIG. 3A and FIG. 3B.

Figure 4:
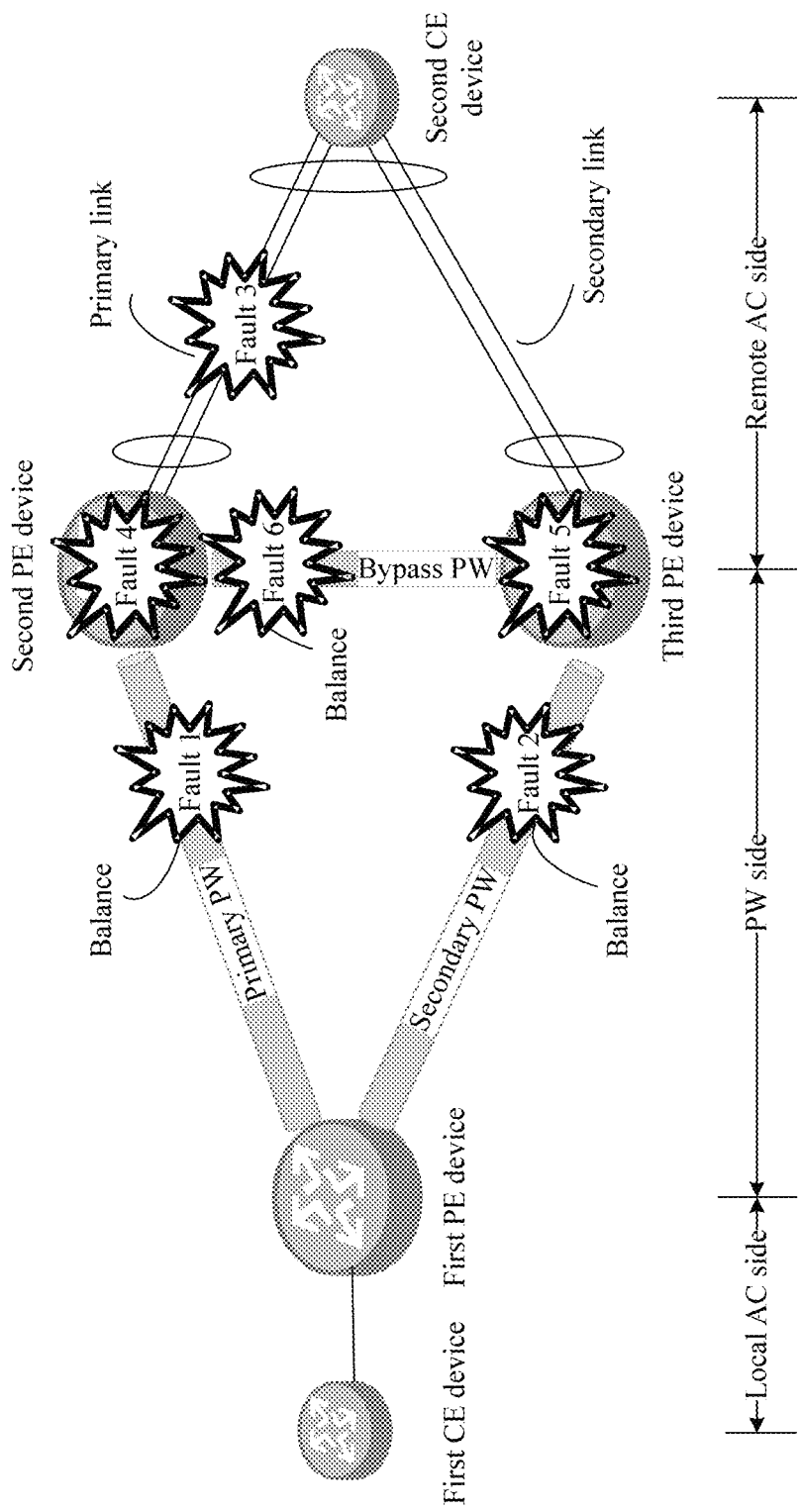
FIG. 4 is a schematic structural diagram of still another VPWS PW redundancy network according to an embodiment of this application.

FIG. 4 is a schematic structural diagram of still another VPWS PW redundancy network according to an embodiment of this application. FIG. 4 is a diagram of a scenario in which faults occur in a traffic balancing forwarding manner shown in FIG. 2. FIG. 4 shows a fault 1, a fault 2, a fault 3, a fault 4, a fault 5, and a fault 6. It should be understood that the scenario shown in FIG. 4 does not represent that the foregoing six faults occur at the same time, but represents positions at which the foregoing six faults occur. A method for processing each fault is discussed in the following embodiments of this application. In addition, only a case in which one fault occurs at a same time is discussed in the following embodiments, and a case in which two or more faults occur at a same time is not discussed.

Figure 5A:
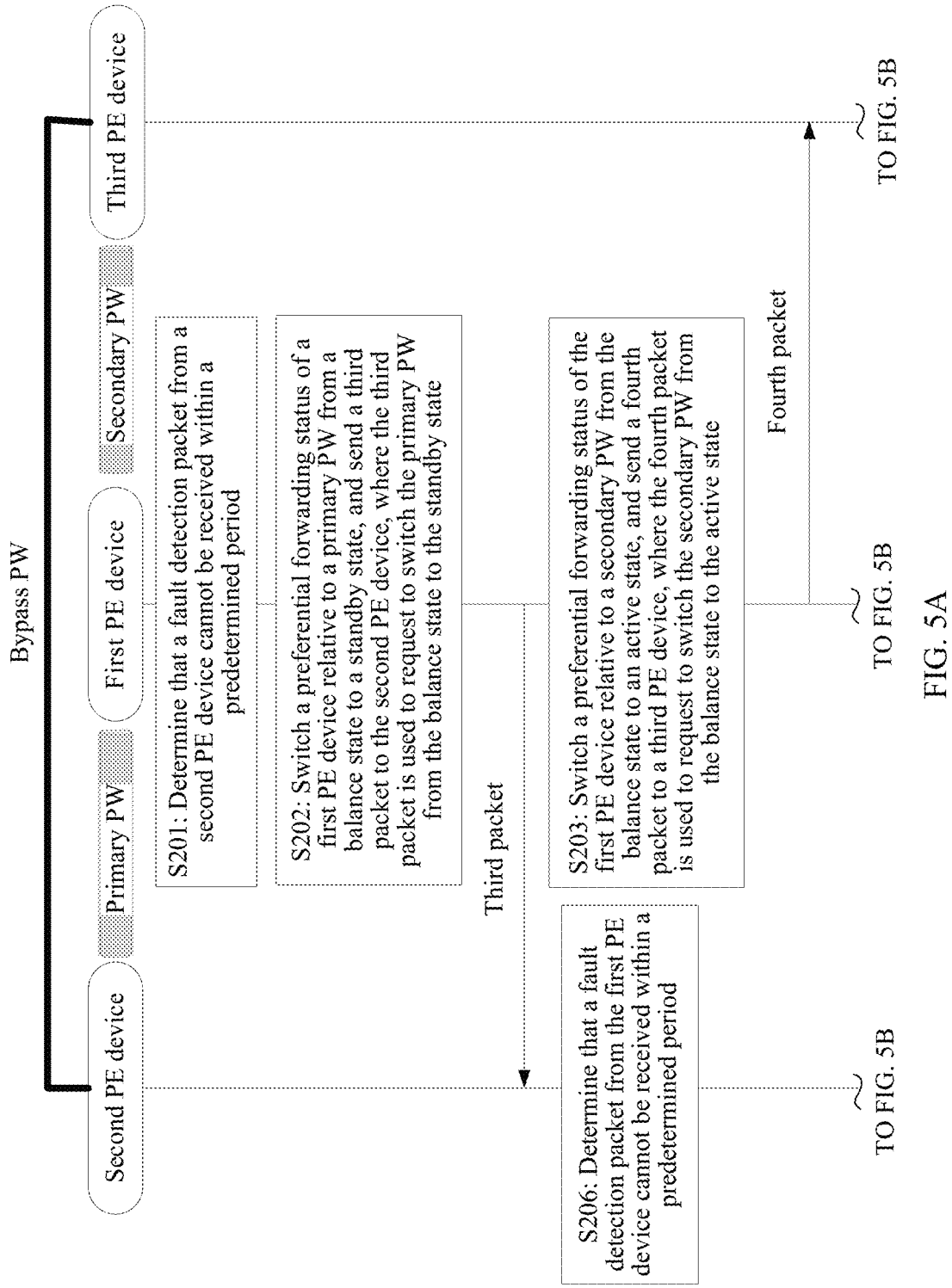

FIG. 5A and FIG. 5B are a flowchart of a method for processing the fault 1 in FIG. 4. In addition, the method shown in FIG. 5A and FIG. 5B is an implementation of fault processing performed when the fault 1 occurs after the traffic balancing forwarding manner shown in FIG. 2 is implemented. The fault 1 means that a fault occurs in a primary PW between a first PE device and a second PE device. The method includes the following steps.

Step S201: The first PE device determines that a fault detection packet from the second PE device cannot be received within a predetermined period.

Based on the foregoing embodiment, data traffic sent by a first CE device to a second CE device and data traffic sent by the second CE device to the first CE device are forwarded on the primary PW and a secondary PW in a traffic balancing manner. In a data traffic forwarding process, the first PE device may send a fault detection packet to the second PE device using the primary PW, and correspondingly, the second PE device may send a fault detection packet to the first PE device using the primary PW. To be specific, the first PE device and the second PE device exchange the fault detection packets. The fault detection packet is used to indicate a fault in a PW link or a PE device. Optionally, the fault detection packet may be sent at a predetermined time interval, and the fault detection packet may be a bidirectional forwarding detection (BFD) packet. If the first PE device does not receive, within the predetermined period, the fault detection packet sent by the second PE device, the first PE device may determine that the primary PW or the second PE device is faulty (this embodiment uses an example in which the primary PW is faulty, and for a case in which the second PE device is faulty, refer to a subsequent embodiment).

Step S202: The first PE device switches a preferential forwarding status of the first PE device relative to the primary PW from a balance state to a standby state, and sends a third packet to the second PE device, where the third packet is used to request to switch the primary PW from the balance state to the standby state.

Step S203: The first PE device switches a preferential forwarding status of the first PE device relative to the secondary PW from the balance state to an active state, and sends a fourth packet to a third PE device, where the fourth packet is used to request to switch the secondary PW from the balance state to the active state.

After determining that the fault detection packet from the second PE device cannot be received within the predetermined period, the first PE device switches the preferential forwarding status of the first PE device relative to the primary PW from the balance state to the standby state, and sends the third packet to the second PE device using the primary PW. The third packet may be a PW status notification packet carrying standby state code, the PW status notification packet may be an LDP packet, and the standby state code is, for example, 0x20. Likewise, the first PE device further switches the preferential forwarding status of the first PE device relative to the secondary PW from the balance state to the active state, and sends the fourth packet to the third PE device using the secondary PW. The fourth packet may be a PW status notification packet carrying active state code, the PW status notification packet may be an LDP packet, and the active state code is, for example, 0x00.

When the first PE device performs steps S202 and S203, an execution sequence is not limited. The first PE device may perform step S202 before step S203, may perform step S202 after step S203, or may perform steps S202 and S203 at the same time. In addition, because the primary PW is faulty, the third packet may not be received by the second PE device. In this case, the first PE device still sends the third packet to reduce complexity of performing an operation by the first PE device.

In a possible implementation, the third packet may further carry fault code. In this case, the third packet may be considered as a combined packet of a switching packet and a fault notification packet. In another possible implementation, for example, in an independent mode, the third packet may not be the PW status notification packet carrying the standby state code, but is an LDP packet carrying the fault code.

Step S204: The third PE device receives the fourth packet.

Step S205: The third PE device switches a preferential forwarding status of the third PE device relative to the secondary PW from the balance state to the active state based on the fourth packet.

For example, the third PE device receives, using the secondary PW, the PW status notification packet carrying the active state code, and switches the secondary PW from the balance state to the active state based on the PW status notification packet.

Step S206: The second PE device determines that a fault detection packet from the first PE device cannot be received within a predetermined period.

An execution sequence of steps S206 and S201 is not limited, and both steps S206 and S201 are triggered based on fault detection packets. After the primary PW is faulty, if the fault detection packets are bi-directionally sent, the second PE device cannot receive the fault detection packet from the first PE device within the predetermined period either. For an implementation of the fault detection packet, refer to the corresponding descriptions of S201, and details are not described herein again.

In addition, the PW link is a bidirectional link. Even if a fault occurs in the PW link in a single direction, the two PE devices cannot receive the fault detection packets of the peer ends. For example, the first PE device and the second PE device exchange BFD packets. It is assumed that a fault occurs in a direction from the first PE device to the second PE device, and normal communication is maintained in a direction from the second PE device to the first PE device. The second PE device cannot receive the BFD packet from the first PE device. The second PE device sets a port to DOWN, and consequently, the second PE device no longer sends a BFD packet to the first PE device. Therefore, the first PE device cannot receive the BFD packet from the second PE device either.

Step S207: The second PE device switches a preferential forwarding status of the second PE device relative to the primary PW from the balance state to the standby state, and sends a fault notification packet to the first PE device, where the fault notification packet is used to notify a fault discovered by the second PE device to the first PE device.

Step S208: The second PE device switches a preferential forwarding status of the second PE device relative to the bypass PW from the balance state to a bypass state, and sends a termination packet to the third PE device, where the termination packet is used to instruct to terminate the balance state of the bypass PW.

After determining that the fault detection packet from the first PE device cannot be received within the predetermined period, the second PE device switches the preferential forwarding status of the second PE device relative to the primary PW from the balance state to the standby state, and sends the fault notification packet to the first PE device using the primary PW. The fault notification packet may be an LDP packet. Likewise, the second PE device further switches the preferential forwarding status of the second PE device relative to the bypass PW from the balance state to the bypass state, and sends the termination packet to the third PE device using the bypass PW. The termination packet is a PW status notification packet carrying termination state code, the PW status notification packet may be an LDP packet, and the termination state code is, for example, 0x32. In addition, because the primary PW is faulty, the fault notification packet may not be received by the first PE device.

Step S209: The third PE device receives the termination packet.

Step S210: The third PE device switches a preferential forwarding status of the third PE device relative to the bypass PW from the balance state to the bypass state based on the termination packet.

For example, the third PE device receives, using the bypass PW, the PW status notification packet carrying the termination state code, and switches the preferential forwarding status of the third PE device relative to the bypass PW from the balance state to the bypass state based on the PW status notification packet.

Through the fault processing process of steps S201 to S210, a forwarding mode in the VPWS PW redundancy network is switched from a traffic balancing mode to a redundancy protection mode. In addition, because the primary PW is faulty, a data traffic forwarding path is the first CE device—the first PE device—the secondary PW—the third PE device—the bypass PW—the second PE device—the primary link—the second CE device. After the fault 1 is cleared, the VPWS PW redundancy network may enter the traffic balancing mode again based on the implementation shown in FIG. 3A and FIG. 3B.

Figure 6A:
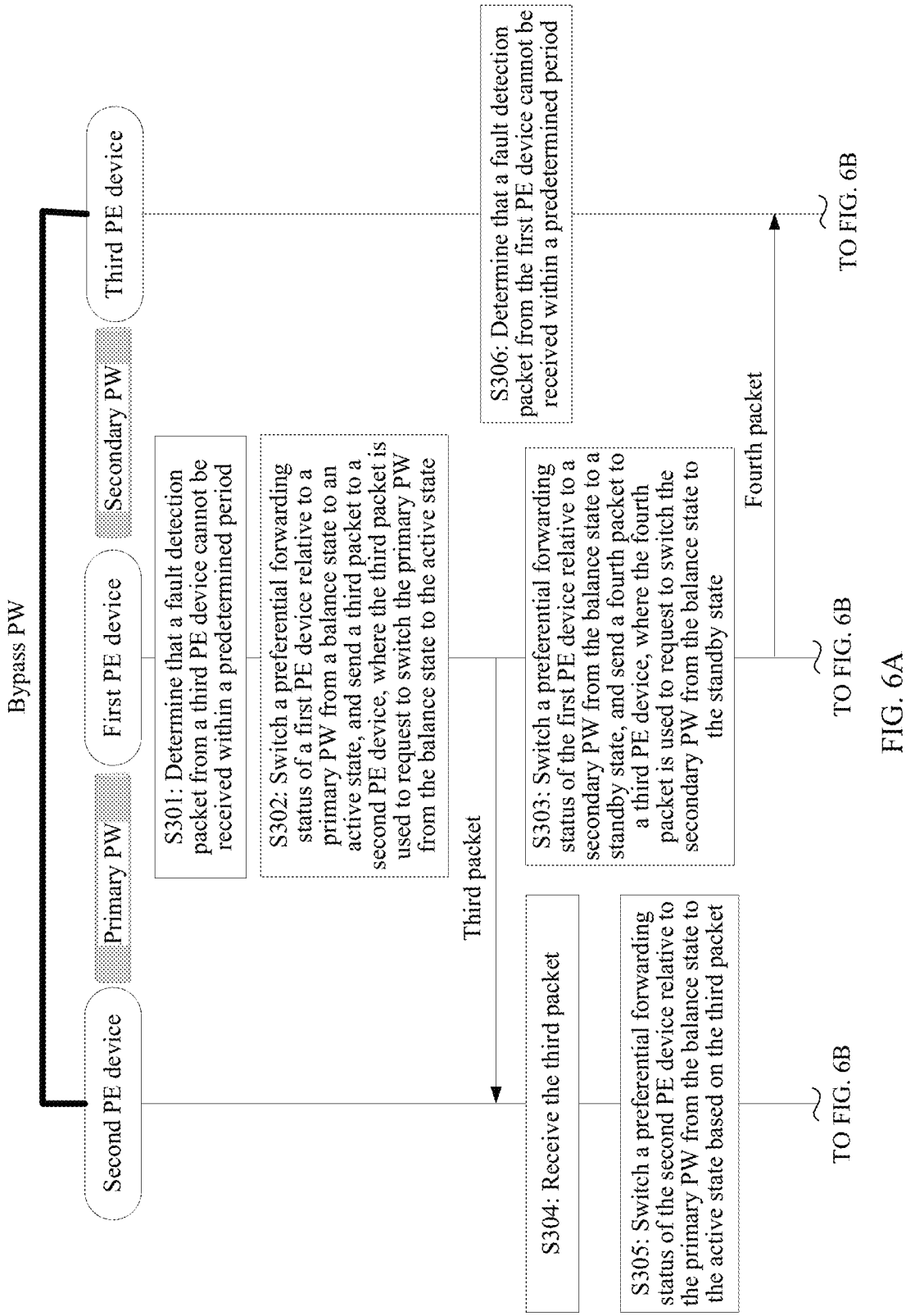

FIG. 6A and FIG. 6B are a flowchart of a method for processing the fault 2 in FIG. 4. In addition, the method shown in FIG. 6A and FIG. 6B is an implementation of fault processing performed when the fault 2 occurs after the traffic balancing forwarding manner shown in FIG. 2 is implemented. The fault 2 means that a fault occurs in a secondary PW between a first PE device and a third PE device. The method includes the following steps.

Step S301: The first PE device determines that a fault detection packet from the third PE device cannot be received within a predetermined period.

Step S302: The first PE device switches a preferential forwarding status of the first PE device relative to a primary PW from a balance state to an active state, and sends a third packet to a second PE device, where the third packet is used to request to switch the primary PW from the balance state to the active state.

Step S303: The first PE device switches a preferential forwarding status of the first PE device relative to the secondary PW from the balance state to a standby state, and sends a fourth packet to the third PE device, where the fourth packet is used to request to switch the secondary PW from the balance state to the standby state.

Based on the foregoing embodiment, for an implementation process of S301 to S303 and implementations of the fault detection packet, the third packet, and the fourth packet, refer to the corresponding descriptions of S201 to S203 in the foregoing embodiment, and details are not described herein again.

When the first PE device performs steps S302 and S303, an execution sequence is not limited. The first PE device may perform step S302 before step S303, may perform step S302 after step S303, or may perform step S302 and step S303 at the same time. In addition, because the secondary PW is faulty, the fourth packet may not be received by the third PE device. In this case, the first PE device still sends the fourth packet, to reduce complexity of performing an operation by the first PE device.

In a possible implementation, the fourth packet may further carry fault code. In this case, the fourth packet may be considered as a combined packet of a switching packet and a fault notification packet. In another possible implementation, for example, in an independent mode, the fourth packet may not be a PW status notification packet carrying standby state code, but is an LDP packet carrying the fault code.

Step S304: The second PE device receives the third packet.

Step S305: The second PE device switches a preferential forwarding status of the second PE device relative to the primary PW from the balance state to the active state based on the third packet.

For example, the second PE device receives, using the primary PW, a PW status notification packet carrying active state code, and switches the primary PW from the balance state to the active state based on the PW status notification packet.

Step S306: The third PE device determines that a fault detection packet from the first PE device cannot be received within a predetermined period.

Step S307: The third PE device switches a preferential forwarding status of the third PE device relative to the secondary PW from the balance state to the standby state, and sends a fault notification packet to the first PE device, where the fault notification packet is used to notify a fault discovered by the third PE device to the first PE device.

Step S308: The third PE device switches a preferential forwarding status of the third PE device relative to a bypass PW from the balance state to a bypass state, and sends a termination packet to the second PE device, where the termination packet is used to instruct to terminate the balance state of the bypass PW.

Based on the foregoing embodiment, for an implementation process of steps S306 to S308 and implementations of the fault detection packet, the fault notification packet, and the termination packet, refer to the corresponding descriptions of steps S206 to S208 in the foregoing embodiment, and details are not described herein again.

Step S309: The second PE device receives the termination packet.

Step S310: The second PE device switches the bypass PW from the balance state to the bypass state based on the termination packet.

For example, the second PE device receives, using the bypass PW, a PW status notification packet carrying termination state code, and switches a preferential forwarding status of the second PE device relative to the bypass PW from the balance state to the bypass state based on the PW status notification packet.

Through the fault processing process of steps S301 to S310, a forwarding mode in the VPWS PW redundancy network is switched from a traffic balancing mode to a redundancy protection mode. In addition, because the secondary PW is faulty, a data traffic forwarding path is a first CE device—the first PE device—the primary PW—the second PE device—a primary link—a second CE device. After the fault 2 is cleared, the VPWS PW redundancy network may enter the traffic balancing mode again based on the implementation shown in FIG. 3A and FIG. 3B.

Figure 7:
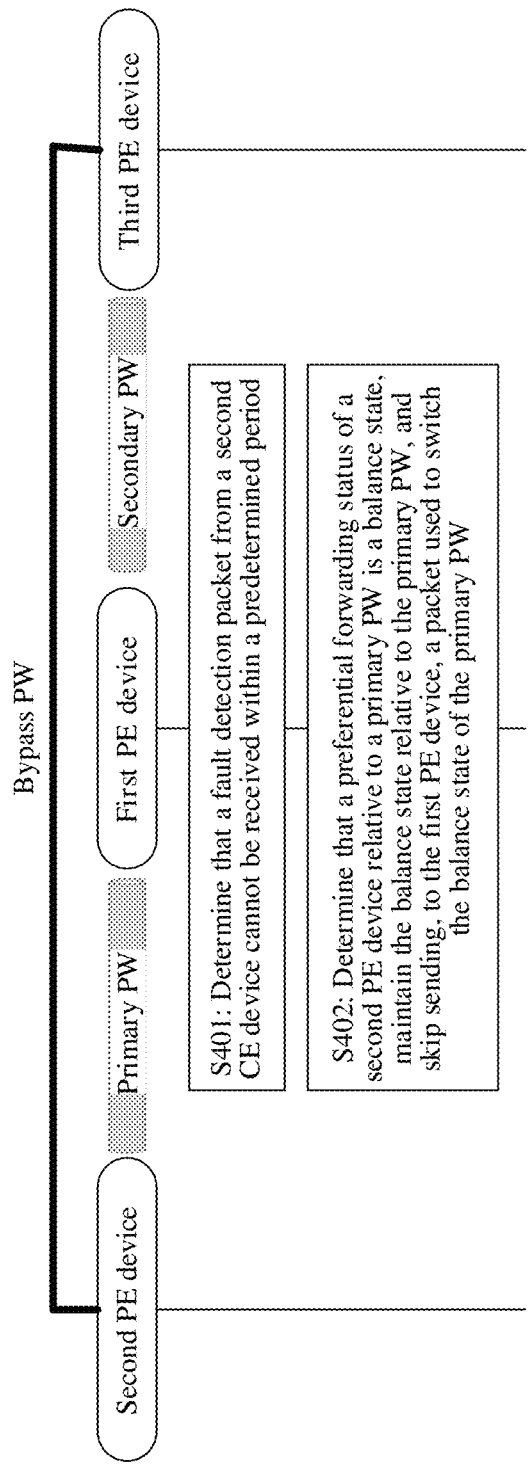
FIG. 7 is a flowchart of still another fault processing method according to an embodiment of this application.

FIG. 7 is a flowchart of a method for processing the fault 3 in FIG. 4. In addition, the method shown in FIG. 7 is an implementation of fault processing performed when the fault 3 occurs after the traffic balancing forwarding manner shown in FIG. 2 is implemented. The fault 3 means that a fault occurs in a primary link between a second PE device and a second CE device. The method includes the following steps.

Step S401: The second PE device determines that a fault detection packet from the second CE device cannot be received within a predetermined period.

Based on the foregoing embodiment, the second CE device is connected to the second PE device and the third PE device in the VPWS PW redundancy network through dual homing using an MC-trunk link. In addition, in a master/slave mode and an independent mode, an Eth-trunk link between the second CE device and the second PE device is determined as a primary link through negotiation, and an Eth-trunk link between the second CE device and the third PE device is determined as a secondary link through negotiation. In the scenario shown in FIG. 2, data traffic sent by the first CE device is forwarded to the second CE device through two paths: "a first PE device—a primary PW—the second PE device—the primary link" and "the first PE device—a secondary PW—the third PE device—a bypass PW—the second PE device—the primary link", and the data traffic sent by the second CE device is forwarded to the first CE device through two paths: "the primary link—the second PE device—the primary PW—the first PE device" and "the primary link—the second PE device—the bypass PW—the third PE device—the secondary PW—the first PE device".

The second PE device and the second CE device send fault detection packets to each other. When the second PE device determines that the fault detection packet from the second CE device cannot be received within the predetermined period, the second PE device may determine that the primary link is faulty. For descriptions that the second PE device and the second CE device exchange fault detection packets and descriptions of the fault detection packets, refer to the descriptions in the foregoing embodiment, and details are not described herein again.

Step S402: The second PE device determines that a preferential forwarding status of the second PE device relative to a primary PW is a balance state, maintains the balance state relative to the primary PW, and skips sending, to a first PE device, a packet used to switch the balance state of the primary PW.

When the second PE device determines that the fault detection packet from the second CE device cannot be received within the predetermined period, correspondingly, the second CE device determines that the fault detection packet from the second PE device cannot be received within a predetermined period either. In this way, the second CE device triggers active/standby switchover of a primary link and a secondary link in a remote AC side network, to switch data traffic to the secondary link.

In the scenario shown in FIG. 1, for the master/slave mode, after the second CE device triggers active/standby switchover of the primary link and the secondary link in the remote AC side network, a PW side network remains unchanged. To be specific, the primary PW maintains an active state, and the secondary PW maintains a standby state. For example, data traffic sent by the first CE device is forwarded to the second CE device through "the first PE device—the primary PW—the second PE device—the bypass PW—the third PE device—the secondary link". In the scenario shown in FIG. 1, for the independent mode, after the second CE device triggers active/standby switchover of the primary link and the secondary link in the remote AC side network, active/standby switchover is correspondingly performed in the PW side network as in the remote AC side network. To be specific, the primary PW maintains the standby state, and the secondary PW maintains the active state. For example, data traffic sent by the first CE device is forwarded to the second CE device through "the first PE device—the secondary PW—the third PE device—the secondary link".

In the scenario shown in FIG. 2, both the primary PW and the secondary PW are in the balance state. Therefore, in the master/slave mode and the independent mode, the second PE device determines that a status of the primary PW is the balance state, maintains the balance state of the primary PW, and does not send, to the first PE device, the packet used to switch the balance state of the primary PW. In this way, the second PE device does not switch the preferential forwarding status, namely the balance state, of the second PE device relative to the primary PW, and does not send any triggering packet to the first PE device. Therefore, the first PE device maintains the preferential forwarding status, namely the balance state, of the first PE device relative to the primary PW and a preferential forwarding status, namely the balance state, of the first PE device relative to the secondary PW, and further, the third PE device maintains the preferential forwarding status, namely the balance state, of the third PE device relative to the secondary PW. The PW side network still maintains the traffic balancing mode. For example, data traffic sent by the first CE device is forwarded to the second CE device through two paths "the first PE device—the primary PW—the second PE device—the bypass PW—the third PE device—the secondary link" and "the first PE device—the secondary PW—the third PE device—the secondary link".

Figure 8A:
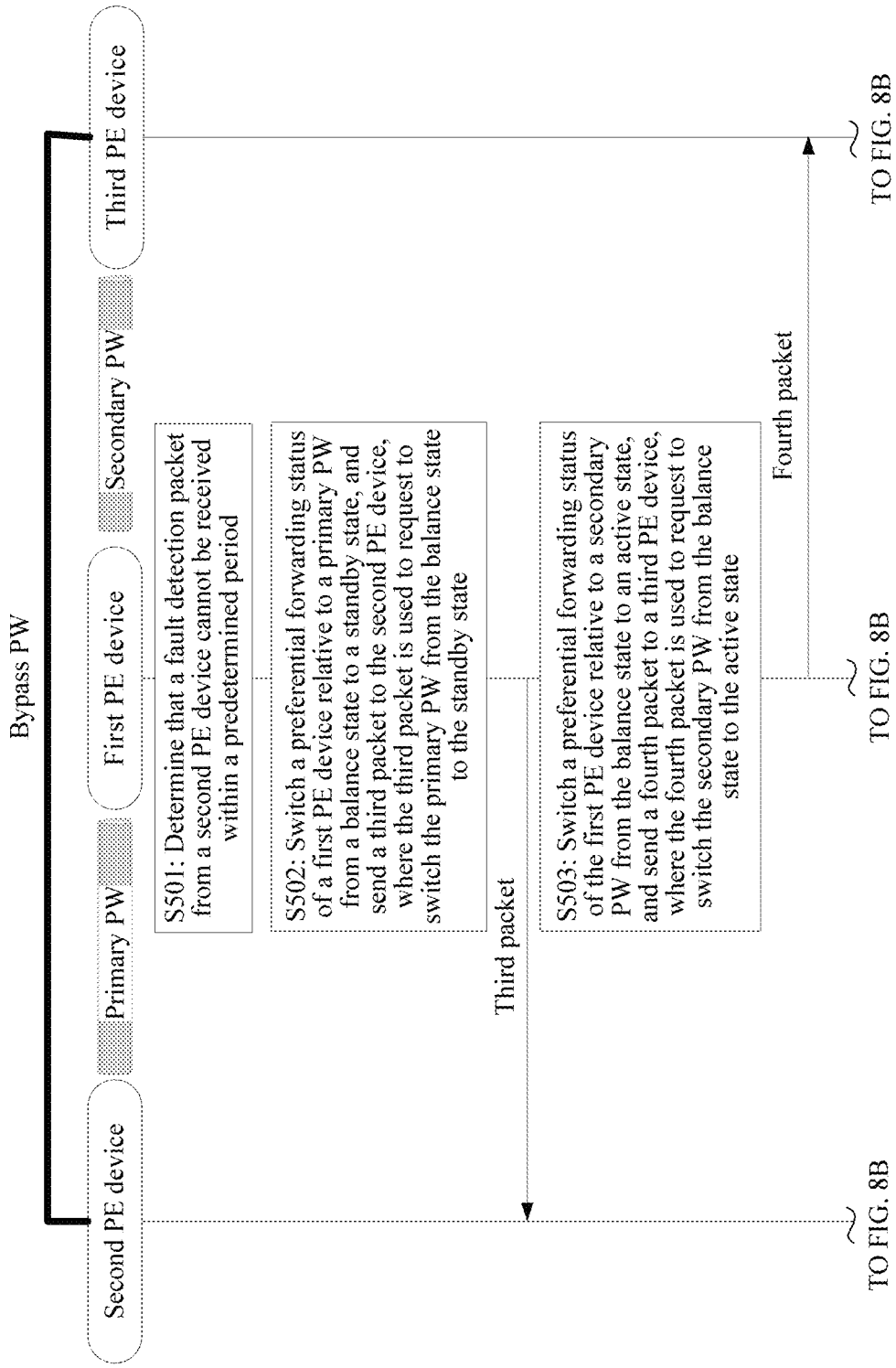
FIG. 8A and FIG. 8B are a flowchart of yet another fault processing method according to an embodiment of this application.
Figure 8B:
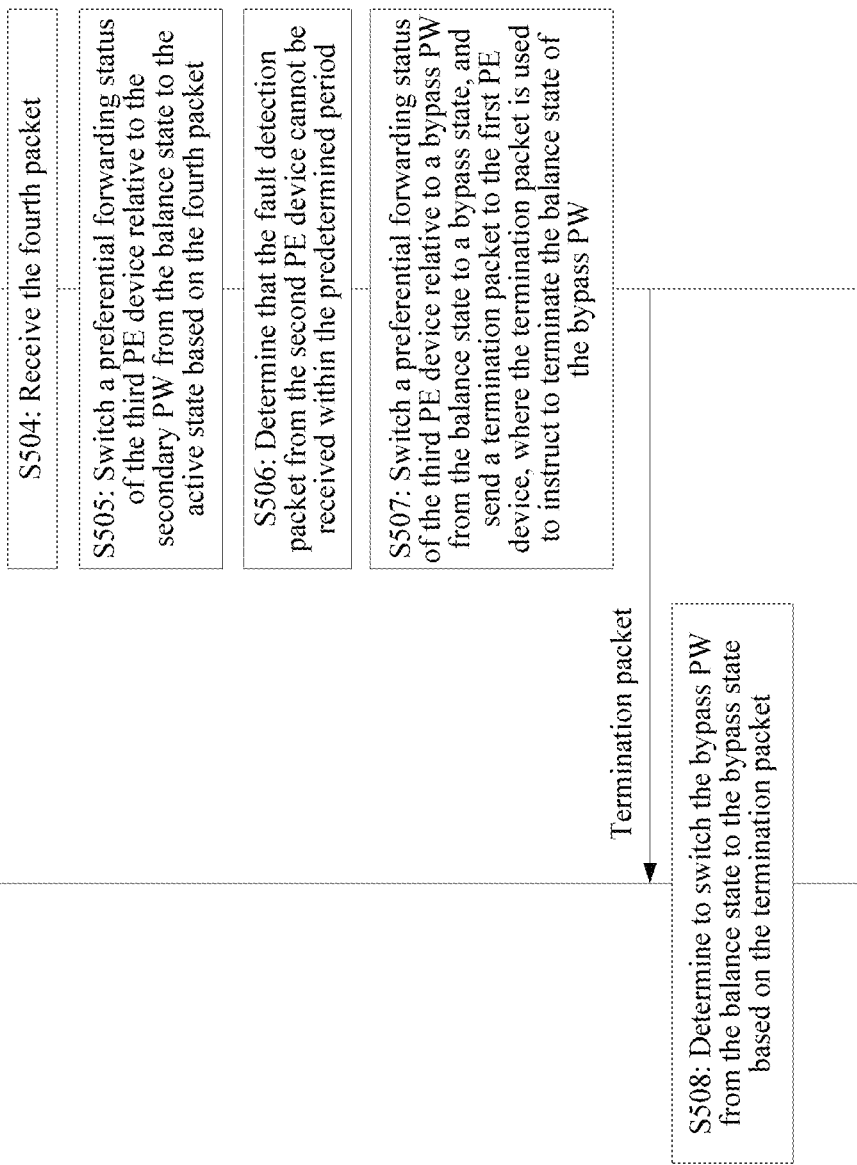

FIG. 8A and FIG. 8B are a flowchart of a method for processing the fault 4 in FIG. 4. In addition, the method shown in FIG. 8A and FIG. 8B is an implementation of fault processing performed when the fault 4 occurs after the traffic balancing forwarding manner shown in FIG. 2 is implemented. The fault 4 means that a fault occurs in a second PE device. The method includes the following steps.

Step S501: A first PE device determines that a fault detection packet from the second PE device cannot be received within a predetermined period.

Step S502: The first PE device switches a preferential forwarding status of the first PE device relative to a primary PW from a balance state to a standby state, and sends a third packet to the second PE device, where the third packet is used to request to switch the primary PW from the balance state to the standby state.

Step S503: The first PE device switches a preferential forwarding status of the first PE device relative to a secondary PW from the balance state to an active state, and sends a fourth packet to a third PE device, where the fourth packet is used to request to switch the secondary PW from the balance state to the active state.

Step S504: The third PE device receives the fourth packet.

Step S505: The third PE device switches a preferential forwarding status of the third PE device relative to the secondary PW from the balance state to the active state based on the fourth packet.

For an implementation process of steps S501 to S505, refer to the corresponding descriptions of steps S201 to S205 in the foregoing embodiment, and details are not described herein again. In step S502, the second PE device cannot receive the third packet due to the fault. However, to reduce complexity of performing an operation by the first PE device, the first PE device still sends the third packet to the second PE device.

Step S506: The third PE device determines that the fault detection packet from the second PE device cannot be received within the predetermined period.

In a normal traffic forwarding scenario shown in FIG. 2, the second PE device and the third PE device send fault detection packets to each other using a bypass PW. To be specific, the second PE device periodically sends the fault detection packet to the third PE device, and the third PE device periodically sends the fault detection packet to the second PE device. According to the foregoing embodiment, the fault detection packet may be a BFD packet. If the third PE device does not receive, within the predetermined period, the fault detection packet that is sent by the second PE device using the bypass PW, the third PE device may determine that the bypass PW or the second PE device is faulty (this embodiment uses an example in which the second PE device is faulty, and for a case in which the bypass PW is faulty, refer to a subsequent embodiment).

Step S507: The third PE device switches a preferential forwarding status of the third PE device relative to a bypass PW from the balance state to a bypass state, and sends a termination packet to the first PE device, where the termination packet is used to instruct to terminate the balance state of the bypass PW.

After determining that the fault detection packet from the second PE device cannot be received within the predetermined period, the third PE device switches the preferential forwarding status of the third PE device relative to the bypass PW from the balance state to the bypass state, and sends the termination packet to the first PE device using the secondary PW. For an implementation of the termination packet, refer to the corresponding descriptions of S208, and details are not described herein again.

In addition, optionally, the third PE device sends the termination packet to the second PE device using the bypass PW. Because the second PE device is faulty, the termination packet cannot be received by the second PE device. The third PE device sends the termination packet, to reduce complexity of performing an operation by the third PE device.

Step S508: The first PE device determines to switch the bypass PW from the balance state to the bypass state based on the termination packet.

Further, after determining to switch the bypass PW from the balance state to the bypass state based on the termination packet, the first PE device performs subsequent data traffic forwarding such that a packet loss possibility can be reduced.

Correspondingly, because the second PE device is faulty, a second CE device triggers active/standby switchover of a primary link and a secondary link in a remote AC side network, to switch data traffic to the secondary link.

Through the fault processing process of steps S501 to S507, a forwarding mode in the VPWS PW redundancy network is switched from a traffic balancing mode to a redundancy protection mode. In addition, because the second PE device is faulty, a data traffic forwarding path is a first CE device—the first PE device—the secondary PW—the third PE device—the secondary link—the second CE device. After the fault 4 is cleared, the VPWS PW redundancy network may enter the traffic balancing mode again based on the implementation shown in FIG. 3A and FIG. 3B.

Figure 9A:
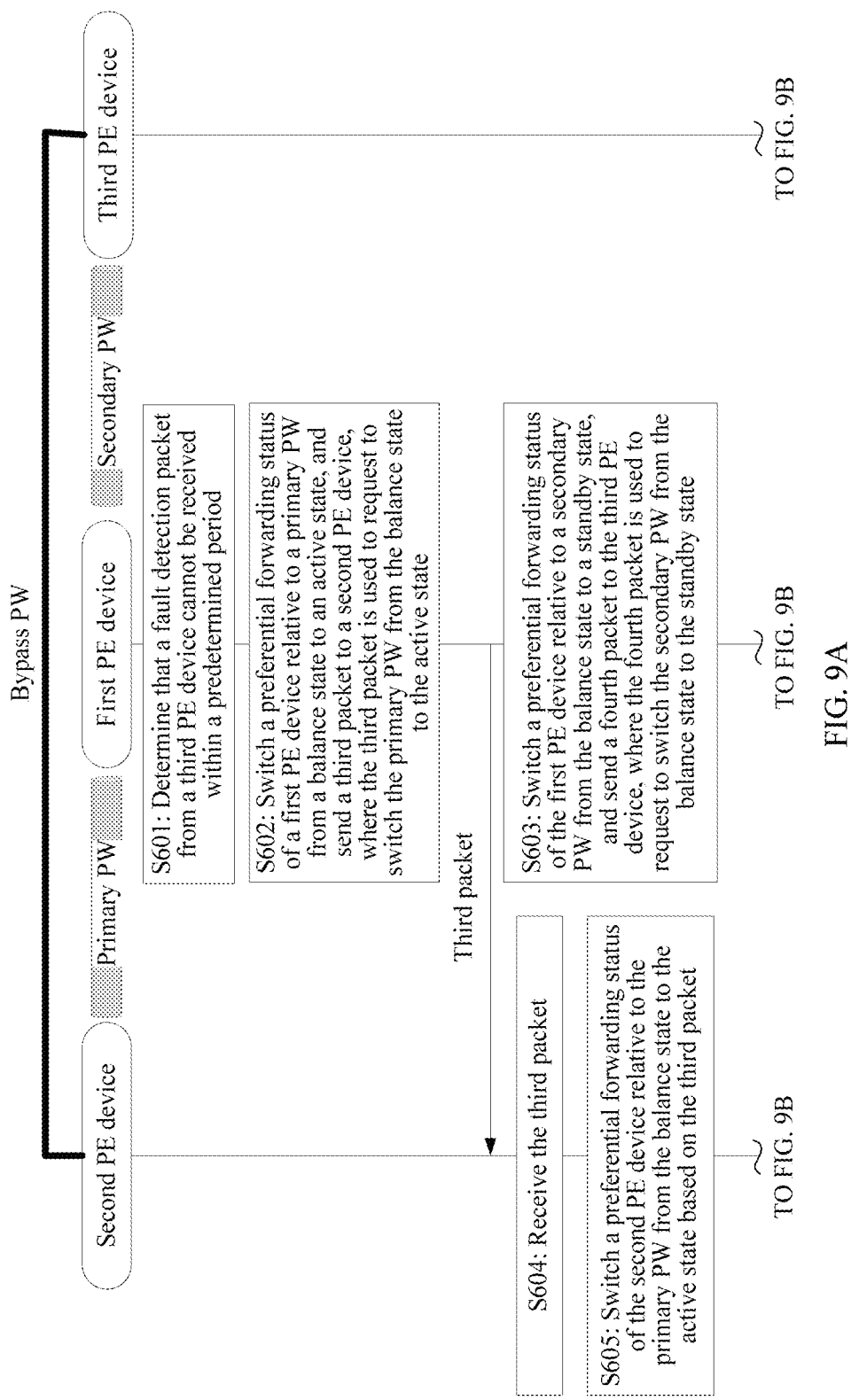
FIG. 9A and FIG. 9B are a flowchart of still yet another fault processing method according to an embodiment of this application.
Figure 9B:
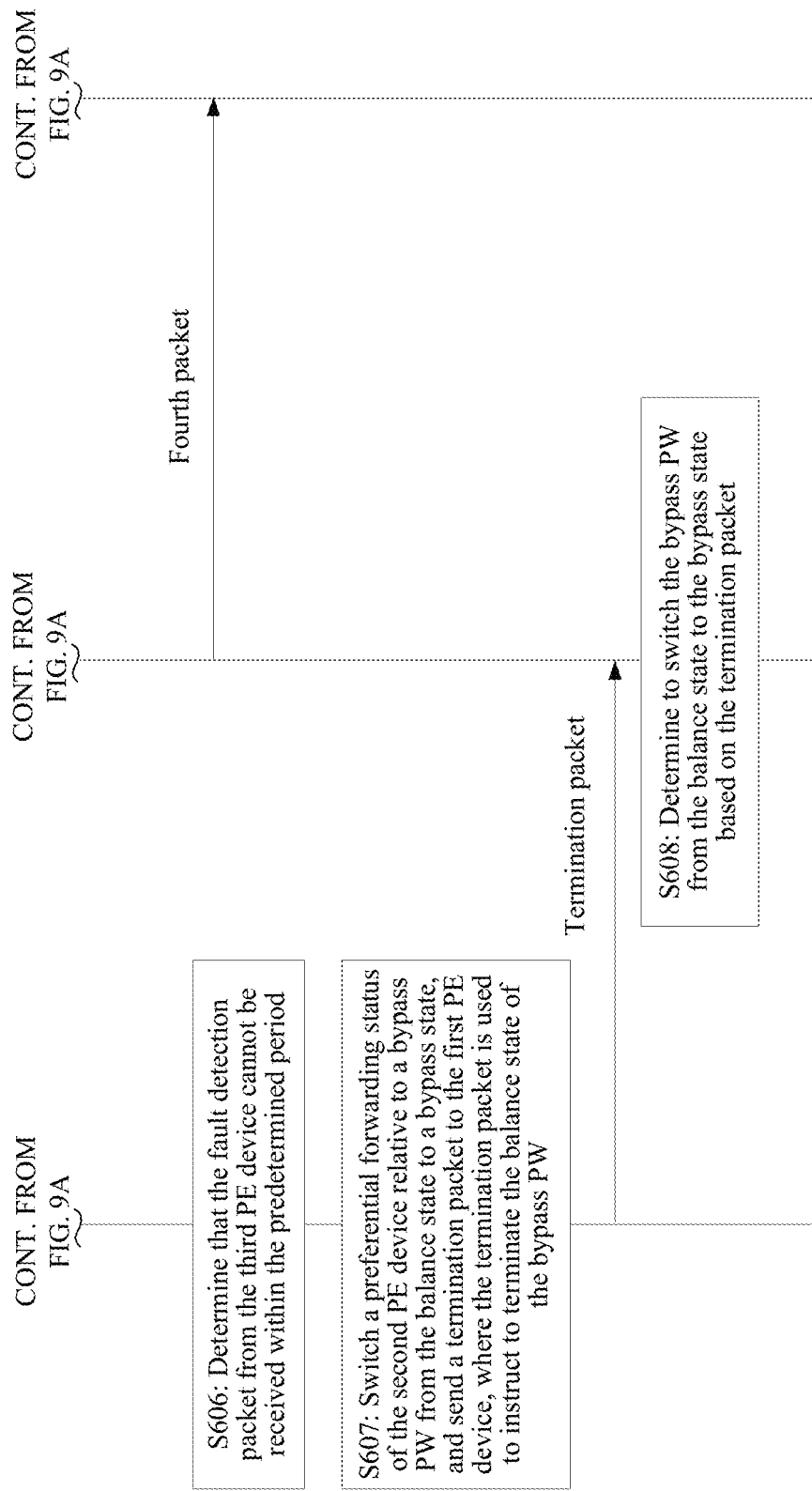

FIG. 9A and FIG. 9B are a flowchart of a method for processing the fault 5 in FIG. 4. In addition, the method shown in FIG. 9A and FIG. 9B is an implementation of fault processing performed when the fault 5 occurs after the traffic balancing forwarding manner shown in FIG. 2 is implemented. The fault 5 means that a fault occurs in a third PE device. The method includes the following steps.

Step S601: The first PE device determines that a fault detection packet from the third PE device cannot be received within a predetermined period.

Step S602: The first PE device switches a preferential forwarding status of the first PE device relative to a primary PW from a balance state to an active state, and sends a third packet to a second PE device, where the third packet is used to request to switch the primary PW from the balance state to the active state.

Step S603: The first PE device switches a preferential forwarding status of the first PE device relative to the secondary PW from the balance state to a standby state, and sends a fourth packet to the third PE device, where the fourth packet is used to request to switch the secondary PW from the balance state to the standby state.

Step S604: The second PE device receives the third packet.

Step S605: The second PE device switches a preferential forwarding status of the second PE device relative to the primary PW from the balance state to the active state based on the third packet.

For an implementation process of steps S601 to S605, refer to the corresponding descriptions of steps S301 to S305 in the foregoing embodiment, and details are not described herein again. In step S603, the third PE device cannot receive the fourth packet due to the fault. However, to reduce complexity of performing an operation by the first PE device, the first PE device still sends the fourth packet to the third PE device.

Step S606: The second PE device determines that the fault detection packet from the third PE device cannot be received within the predetermined period.

In a normal traffic forwarding scenario shown in FIG. 2, the second PE device and the third PE device send fault detection packets to each other using a bypass PW. To be specific, the second PE device periodically sends the fault detection packet to the third PE device, and the third PE device periodically sends the fault detection packet to the second PE device. According to the foregoing embodiment, the fault detection packet may be a BFD packet. If the second PE device does not receive, within the predetermined period, the fault detection packet that is sent by the third PE device using the bypass PW, the second PE device may determine that the bypass PW or the third PE device is faulty (this embodiment uses an example in which the third PE device is faulty, and for a case in which the bypass PW is faulty, refer to a subsequent embodiment).

Step S607: The second PE device switches a preferential forwarding status of the second PE device relative to a bypass PW from the balance state to a bypass state, and sends a termination packet to the first PE device, where the termination packet is used to instruct to terminate the balance state of the bypass PW.

After determining that the fault detection packet from the third PE device cannot be received within the predetermined period, the second PE device switches the preferential forwarding status of the second PE device relative to the bypass PW from the balance state to the bypass state, and sends the termination packet to the first PE device using the primary PW. For an implementation of the termination packet, refer to the corresponding descriptions of S208, and details are not described herein again.

In addition, optionally, the second PE device sends the termination packet to the third PE device using the bypass PW. Because the third PE device is faulty, the termination packet cannot be received by the third PE device. The second PE device sends the termination packet, to reduce complexity of performing an operation by the second PE device.

Step S608: The first PE device determines to switch the bypass PW from the balance state to the bypass state based on the termination packet.

Further, after determining to switch the bypass PW from the balance state to the bypass state based on the termination packet, the first PE device performs subsequent data traffic forwarding such that a packet loss possibility can be reduced.

Through the fault processing process of steps S601 to S608, a forwarding mode in the VPWS PW redundancy network is switched from a traffic balancing mode to a redundancy protection mode. In addition, because the third PE device is faulty, a data traffic forwarding path is a first CE device—the first PE device—the primary PW—the second PE device—a primary link—a second CE device. After the fault 5 is cleared, the VPWS PW redundancy network may enter the traffic balancing mode again based on the implementation shown in FIG. 3A and FIG. 3B.

Figure 10A:
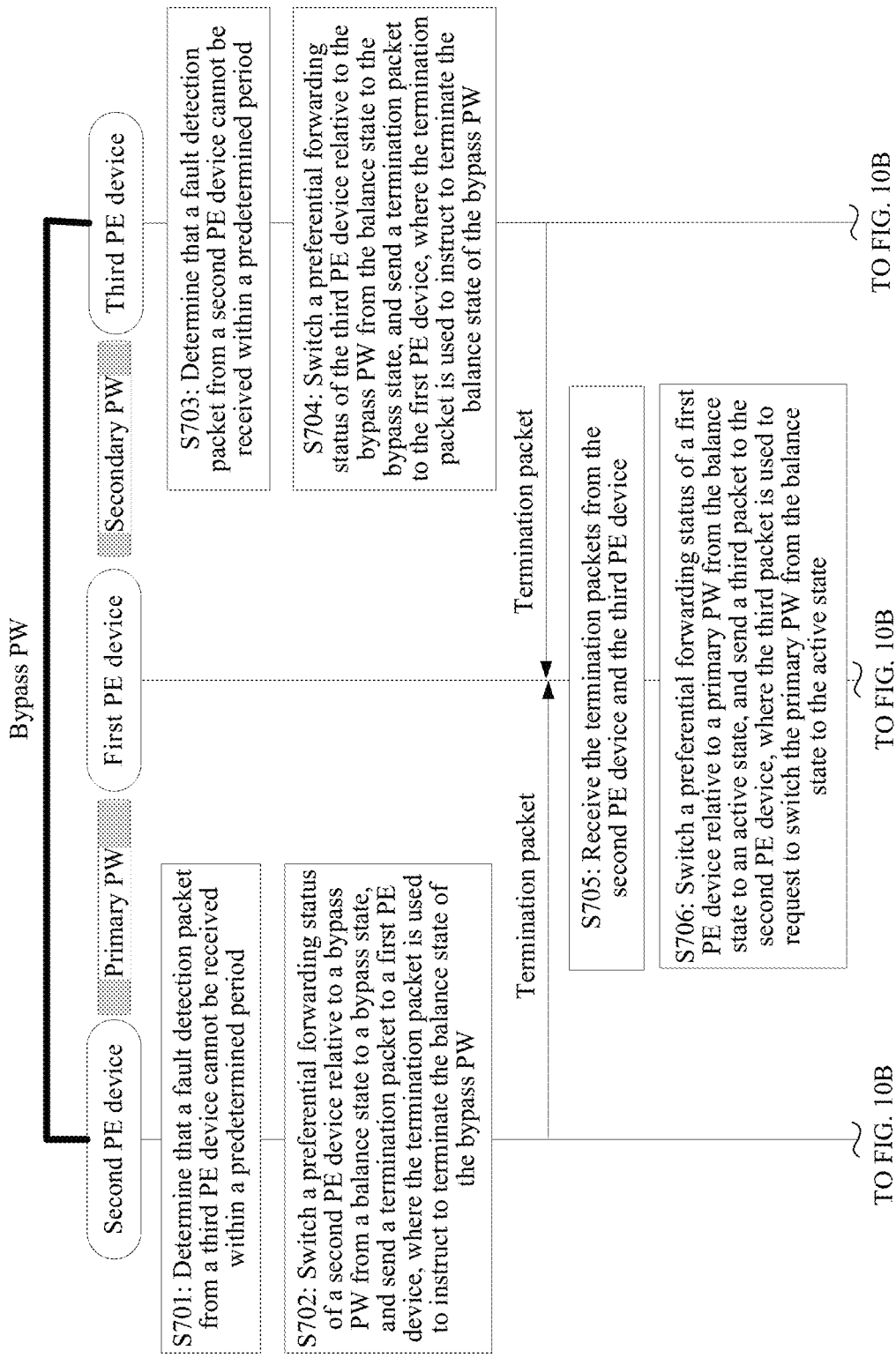

FIG. 10A and FIG. 10B are a flowchart of a method for processing the fault 6 in FIG. 4. In addition, the method shown in FIG. 10A and FIG. 10B is an implementation of fault processing performed when the fault 6 occurs after the traffic balancing forwarding manner shown in FIG. 2 is implemented. The fault 6 means that a fault occurs in a bypass PW between a second PE device and a third PE device. The method includes the following steps.

Step S701: The second PE device determines that a fault detection packet from the third PE device cannot be received within a predetermined period.

Step S702: The second PE device switches a preferential forwarding status of the second PE device relative to the bypass PW from a balance state to a bypass state, and sends a termination packet to the first PE device, where the termination packet is used to instruct to terminate the balance state of the bypass PW.

For an implementation process of steps S701 and S702, refer to the corresponding descriptions of steps S606 and S607 in the foregoing embodiment, and details are not described herein again.

Step S703: The third PE device determines that a fault detection packet from the second PE device cannot be received within a predetermined period.

Step S704: The third PE device switches a preferential forwarding status of the third PE device relative to the bypass PW from the balance state to the bypass state, and sends a termination packet to the first PE device, where the termination packet is used to instruct to terminate the balance state of the bypass PW.

For an implementation process of steps S703 and S704, refer to the corresponding descriptions of steps S506 and S507 in the foregoing embodiment, and details are not described herein again.

Step S705: The first PE device receives the termination packets from the second PE device and the third PE device.

For an implementation process of step S705, refer to the corresponding descriptions of steps S508 and S608 in the foregoing embodiment. Based on the corresponding descriptions of steps S508 and S608, if the first PE device receives only the termination packet from the second PE device or only the termination packet from the third PE device, the first PE device cannot determine that the bypass PW is faulty, and this is because the second PE device or the third PE device may not send the termination packet due to a fault. Therefore, the first PE device may determine, based on a case in which the termination packet from the second PE device and the termination packet from the third PE device can be received, that the bypass PW is faulty, and trigger steps S706 and S707.

Step S706: The first PE device switches a preferential forwarding status of the first PE device relative to a primary PW from the balance state to an active state, and sends a third packet to the second PE device, where the third packet is used to request to switch the primary PW from the balance state to the active state.

Step S707: The first PE device switches a preferential forwarding status of the first PE device relative to a secondary PW from the balance state to a standby state, and sends a fourth packet to the third PE device, where the fourth packet is used to request to switch the secondary PW from the balance state to the standby state.

For an implementation process of steps S706 and S707, refer to the corresponding descriptions of steps S302 and S303 in the foregoing embodiment, and details are not described herein again.

Step S708: The second PE device receives the third packet.

Step S709: The second PE device switches a preferential forwarding status of the second PE device relative to the primary PW from the balance state to the active state based on the third packet.

With reference to the foregoing embodiment, for example, the second PE device receives, using the primary PW, a PW status notification packet carrying active state code, and switches the preferential forwarding status of the second PE device relative to the primary PW from the balance state to the active state based on the PW status notification packet.

Step S710: The third PE device receives the fourth packet.

Step S711: The third PE device switches a preferential forwarding status of the third PE device relative to the secondary PW from the balance state to the standby state based on the fourth packet.

With reference to the foregoing embodiment, for example, the third PE device receives, using the secondary PW, a PW status notification packet carrying standby state code, and switches the preferential forwarding status of the third PE device relative to the secondary PW from the balance state to the standby state based on the PW status notification packet.

Through the fault processing process of steps S701 to S711, a forwarding mode in the VPWS PW redundancy network is switched from a traffic balancing mode to a redundancy protection mode. In addition, because the bypass PW is faulty, a data traffic forwarding path is a first CE device—the first PE device—the primary PW—the second PE device—a primary link—a second CE device. After the fault 6 is cleared, the VPWS PW redundancy network may enter the traffic balancing mode again based on the implementation shown in FIG. 3A and FIG. 3B.

FIG. 11 to FIG. 16 are schematic diagrams of PE structures and hardware in a VPWS PW redundancy network according to this application. The VPWS PW redundancy network includes a first PE device, a second PE device, and a third PE device, a primary PW is set up between the first PE device and the second PE device, a secondary PW is set up between the first PE device and the third PE device, and a bypass PW is set up between the second PE device and the third PE device.

Figure 11:
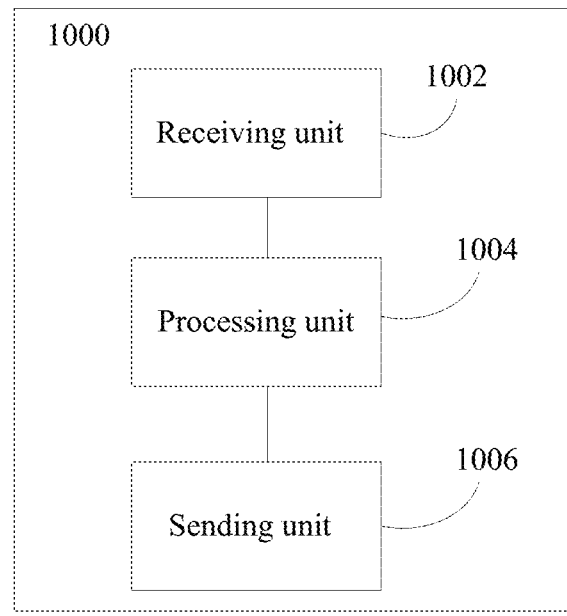
FIG. 11 is a schematic structural diagram of a first PE device according to an embodiment of this application.

FIG. 11 is a schematic structural diagram of a first PE device 1000 according to an embodiment of this application. The first PE device shown in FIG. 11 may perform corresponding steps performed by the first PE device in the methods in the foregoing embodiments. As shown in FIG. 11, the first PE device 1000 includes a receiving unit 1002, a processing unit 1004, and a sending unit 1006.

The sending unit 1006 is configured to send a first packet to the second PE device using the primary PW, where the first packet is used to request to switch the primary PW from an active state of forwarding traffic to a balance state of forwarding traffic, and the balance state is used to instruct to forward traffic in a traffic balancing manner.

The sending unit 1006 is further configured to send a second packet to the third PE device using the secondary PW, where the second packet is used to request to switch the secondary PW from a standby state of not forwarding traffic to the balance state of forwarding traffic.

The receiving unit 1002 is configured to receive a response packet from the second PE device using the primary PW, where the response packet is determined and obtained by the second PE device based on the first packet and the second packet, the second packet is forwarded by the third PE device and received by the second PE device using the bypass PW, and the response packet is used to indicate that switching requests in the first packet and the second packet are accepted.

The processing unit 1004 is configured to switch, based on the response packet, a preferential forwarding status of the first PE device relative to the primary PW from the active state of forwarding traffic to the balance state of forwarding traffic and a preferential forwarding status of the first PE device relative to the secondary PW from the standby state of not forwarding traffic to the balance state of forwarding traffic.

Optionally, the receiving unit 1002 is further configured to receive traffic from a CE device, and the sending unit is further configured to forward the traffic from the CE device to second PE device and the third PE device in the traffic balancing manner using the primary PW and the secondary PW that are in the balance state.

Optionally, before the sending unit 1006 sends the first packet to the second PE device using the primary PW, the processing unit 1004 is further configured to determine that a bandwidth occupation rate at which the sending unit 1006 sends traffic to the second PE device exceeds a predetermined threshold.

Optionally, the processing unit 1004 is further configured to determine that a fault detection packet from the second PE device cannot be received within a predetermined period, and switch the preferential forwarding status of the first PE device relative to the primary PW from the balance state to the standby state, the sending unit 1006 is further configured to send a third packet to the second PE device, where the third packet is used to request to switch the primary PW from the balance state to the standby state, the processing unit 1004 is further configured to switch the preferential forwarding status of the first PE device relative to the secondary PW from the balance state to the active state, and the sending unit 1006 is further configured to send a fourth packet to the third PE device, where the fourth packet is used to request to switch the secondary PW from the balance state to the active state.

Optionally, the processing unit 1004 is further configured to determine that a fault detection packet from the third PE device cannot be received within a predetermined period, and switch the preferential forwarding status of the first PE device relative to the primary PW from the balance state to the active state, the sending unit 1006 is further configured to send a third packet to the second PE device, where the third packet is used to request to switch the primary PW from the balance state to the active state, the processing unit 1004 is further configured to switch the preferential forwarding status of the first PE device relative to the secondary PW from the balance state to the standby state, and the sending unit 1006 is further configured to send a fourth packet to the third PE device, where the fourth packet requests to switch the secondary PW from the balance state to the standby state.

Optionally, the receiving unit 1002 is further configured to receive termination packets from the second PE device and the third PE device, where the termination packets are used to instruct to terminate the balance state of the bypass PW, the processing unit 1004 is further configured to switch the preferential forwarding status of the first PE device relative to the primary PW from the balance state to the active state, the sending unit 1006 is further configured to send a third packet to the second PE device, where the third packet is used to request to switch the primary PW from the balance state to the active state, the processing unit 1004 is further configured to switch the preferential forwarding status of the first PE device relative to the secondary PW from the balance state to the standby state, and the sending unit 1006 is further configured to send a fourth packet to the third PE device, where the fourth packet is used to request to switch the secondary PW from the balance state to the standby state.

The first PE device shown in FIG. 11 may perform corresponding steps performed by the first PE device in the methods in the foregoing embodiments, to ensure that traffic balancing between the primary PW and the secondary PW is implemented when redundancy protection functions of the primary PW and the secondary PW in a VPWS PW are reserved, thereby helping improve bandwidth utilization of the VPWS PW.

Figure 12:
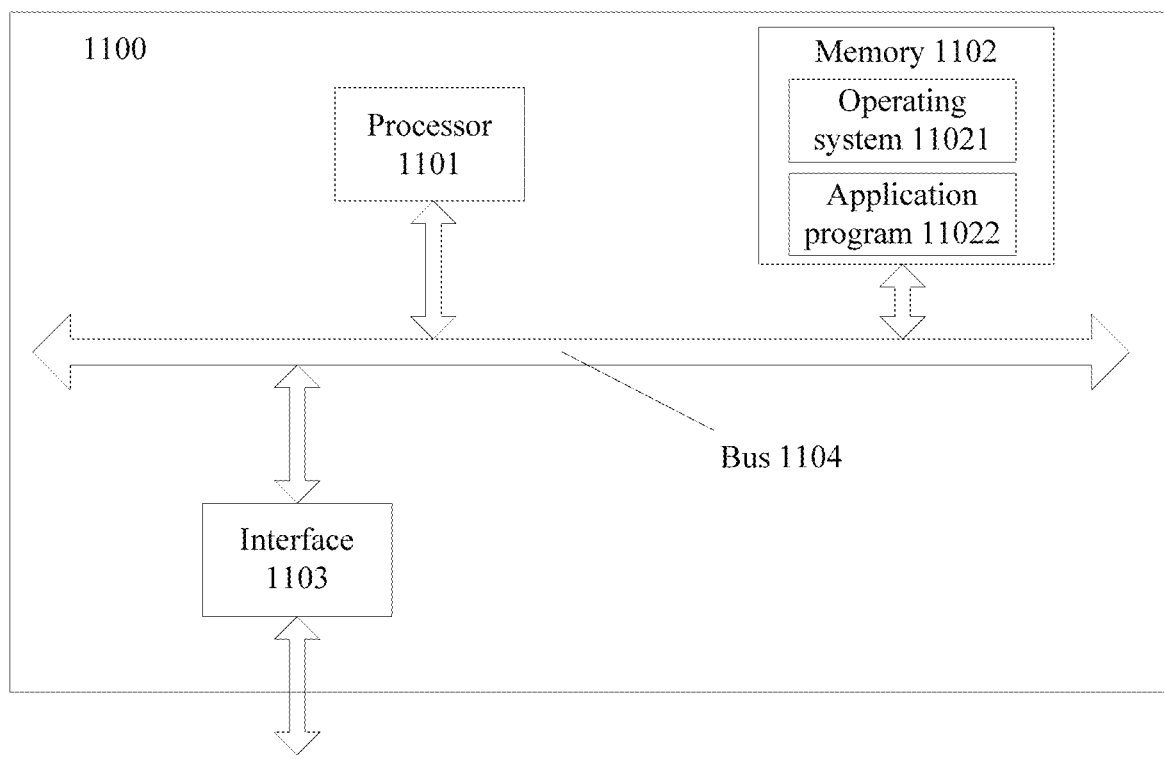
FIG. 12 is a schematic diagram of a hardware structure of a first PE device according to an embodiment of this application.

FIG. 12 is a schematic diagram of a hardware structure of a first PE device 1100 according to an embodiment of this application. The first PE device shown in FIG. 12 may perform corresponding steps performed by the first PE device in the methods in the foregoing embodiments.

As shown in FIG. 12, the first PE device 1100 includes a processor 1101, a memory 1102, an interface 1103, and a bus 1104. The interface 1103 may be implemented in a wireless or wired manner, and may be an element such as a network adapter. The processor 1101, the memory 1102, and the interface 1103 are connected using the bus 1104.

The interface 1103 may include a transmitter and a receiver, and is configured for the first PE device to send information to and receive information from a second PE device and a third PE device in the foregoing embodiments, or is configured for the first PE device to send information to and receive information from a first CE device connected to the first PE device. In an example, the interface 1103 is configured to support the processes of steps S101, S102, and S109 in FIG. 3A and FIG. 3B, and the processes of steps S202, S203, S302, S303, S502, S503, S602, S603, S705, S706, and S707 in FIG. 5A to FIG. 10B. The processor 1101 is configured to perform processing performed by the first PE device in the foregoing embodiments. For example, the processor 1101 is configured to switch preferential forwarding statuses of the first PE device relative to a primary PW and a secondary PW, is further configured to generate a PW status notification packet and/or a fault detection packet, and send the PW status notification packet and/or the fault detection packet to the second PE device and the third PE device using the interface 1103, is further configured to process PW status notification packets and/or termination packets from the second PE device and the third PE device, and/or is configured to perform other processes of the technologies described in this specification. In an example, the processor 1101 is configured to support the process of step S110 in FIG. 3B, and the processes of steps S201, S202, S203, S301, S302, S303, S401, S402, S501, S502, S503, S508, S601, S602, S603, S608, S706, and S707 in FIG. 5A to FIG. 10B. The memory 1102 includes an operating system 11021 and an application program 11022, and is configured to store programs, code, or instructions. When the processor or a hardware device executes these programs, code, or instructions, the processing processes related to the first PE device in FIG. 3A and FIG. 3B, and FIG. 5A to FIG. 10B may be implemented.

It may be understood that FIG. 12 shows only a simplified design of the first PE device. In actual application, the first PE device may include any quantity of interfaces, processors, memories, and the like, and all first PE devices capable of implementing this application shall fall within the protection scope of this application.

In addition, an embodiment of this application provides a computer storage medium configured to store a computer software instruction used by the first PE device. The computer software instruction includes a program designed for performing the embodiments shown in FIG. 3A and FIG. 3B, and FIG. 5A to FIG. 10B.

Figure 13:
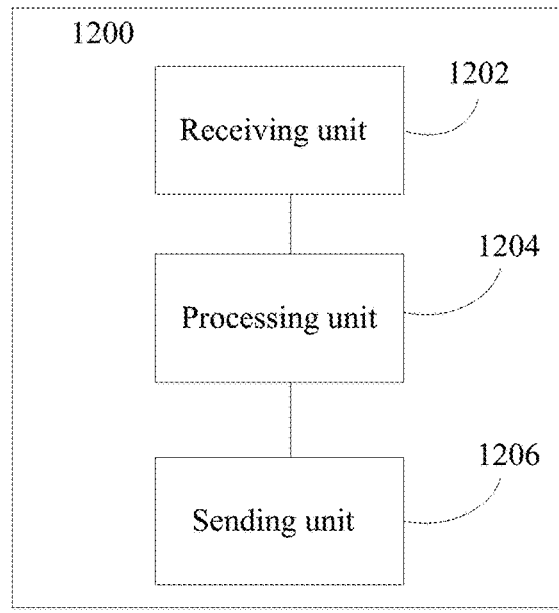
FIG. 13 is a schematic structural diagram of a second PE device according to an embodiment of this application.

FIG. 13 is a schematic structural diagram of a second PE device 1200 according to an embodiment of this application. The second PE device shown in FIG. 13 may perform corresponding steps performed by the second PE device in the methods in the foregoing embodiments. As shown in FIG. 13, the second PE device 1200 includes a receiving unit 1202, a processing unit 1204, and a sending unit 1206.

The receiving unit 1202 is configured to receive a first packet from the first PE device using the primary PW, where the first packet is used to request to switch the primary PW from an active state of forwarding traffic to a balance state of forwarding traffic, and the balance state is used to instruct to forward traffic in a traffic balancing manner.

The receiving unit 1202 is further configured to receive, using the bypass PW, a second packet forwarded by the third PE device, where the second packet is used to request to switch the secondary PW from a standby state of not forwarding traffic to the balance state of forwarding traffic.

The processing unit 1204 is configured to generate a response packet based on the first packet and the second packet, switch a preferential forwarding status of the second PE device relative to the primary PW from the active state of forwarding traffic to the balance state of forwarding traffic, and switch a preferential forwarding status of the second PE device relative to the bypass PW from a bypass state to the balance state.

The sending unit 1206 is configured to send the response packet to the first PE device using the primary PW, and send the response packet to the third PE device using the bypass PW, where the response packet is used to indicate that switching requests in the first packet and the second packet are accepted.

Optionally, a CE device is connected to the second PE device and the third PE device in the VPWS PW redundancy network through dual homing using an MC-trunk link, a link between the CE device and the second PE device is a primary link, and a link between the CE device and the third PE device is a secondary link, the receiving unit 1202 is further configured to receive traffic from the CE device using the primary link, and the sending unit 1206 is further configured to forward the traffic from the CE device to the first PE device and the third PE device in the traffic balancing manner using the primary PW and the bypass PW that are in the balance state.

Optionally, before generating the response packet based on the first packet and the second packet, the processing unit 1204 is further configured to switch the preferential forwarding status of the second PE device relative to the primary PW from the active state of forwarding traffic to the balance state of forwarding traffic, switch the preferential forwarding status of the second PE device relative to the bypass PW from the bypass state to the balance state, and determine that a bandwidth occupation rate of an outbound interface over which the second PE device sends traffic to the third PE device is less than a predetermined threshold.

Optionally, the processing unit 1204 is further configured to determine that a fault detection packet from the first PE device cannot be received within a predetermined period, and switch the preferential forwarding status of the second PE device relative to the primary PW from the balance state to the standby state, the sending unit 1206 is further configured to send a fault notification packet to the first PE device, where the fault notification packet is used to notify a fault discovered by the second PE device to the first PE device, the processing unit 1204 is further configured to switch the preferential forwarding status of the second PE device relative to the bypass PW from the balance state to the bypass state, and the sending unit 1206 is further configured to send a termination packet to the third PE device, where the termination packet is used to instruct to terminate the balance state of the bypass PW.

Optionally, the processing unit 1204 is further configured to determine that a fault detection packet from the CE device cannot be received within a predetermined period, determine that the preferential forwarding status of the second PE device relative to the primary PW is the balance state, maintain the balance state relative to the primary PW, and skip controlling the sending unit 1206 to send, to the first PE device, a packet used to switch the balance state of the primary PW.

Optionally, the processing unit 1204 is further configured to determine that a fault detection packet from the third PE device cannot be received within a predetermined period, and switch the preferential forwarding status of the second PE device relative to the bypass PW from the balance state to the bypass state, the sending unit 1206 is further configured to send a termination packet to the first PE device, where the termination packet is used to instruct to terminate the balance state of the bypass PW, the receiving unit 1202 is further configured to receive a third packet from the first PE device, where the third packet is used to request to switch the primary PW from the balance state to the active state, and the processing unit 1204 is further configured to switch the preferential forwarding status of the second PE device relative to the primary PW from the balance state to the active state based on the third packet.

The second PE device shown in FIG. 13 may perform the corresponding steps performed by the second PE device in the methods in the foregoing embodiments, to ensure that traffic balancing between the primary PW and the secondary PW is implemented when redundancy protection functions of the primary PW and the secondary PW in the VPWS PW are reserved, thereby helping improve bandwidth utilization of the VPWS PW.

Figure 14:
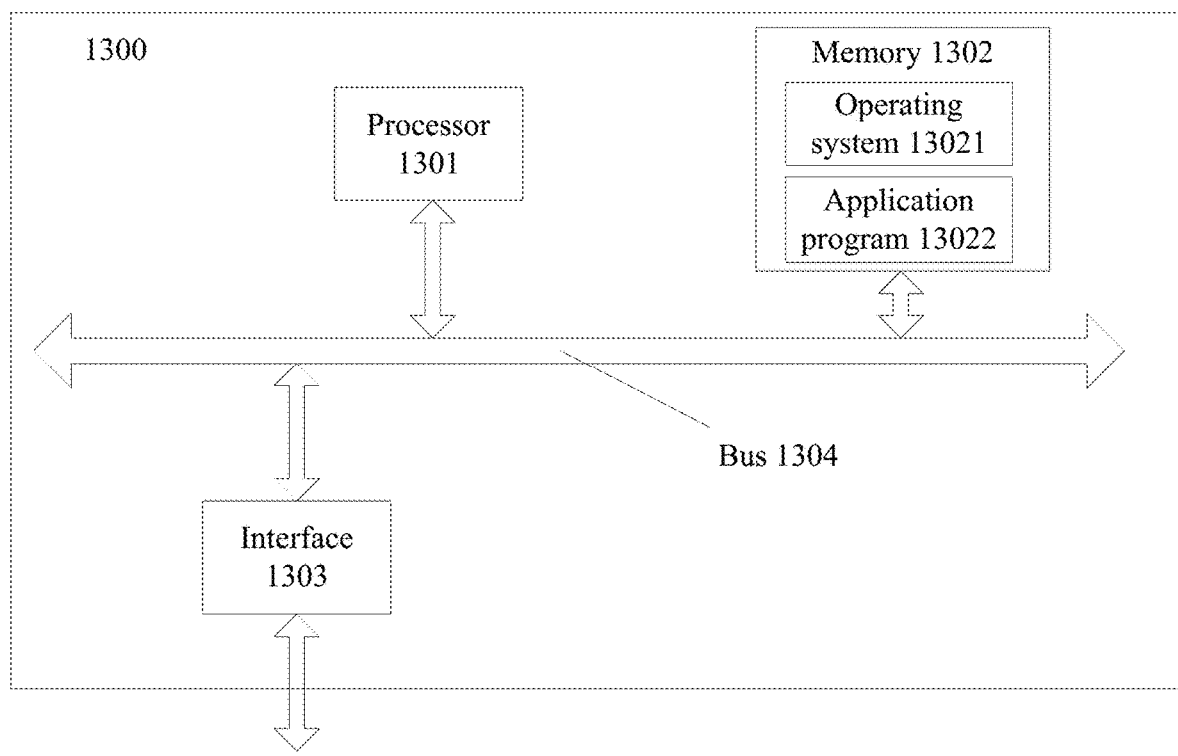
FIG. 14 is a schematic diagram of a hardware structure of a second PE device according to an embodiment of this application.

FIG. 14 is a schematic diagram of a hardware structure of a second PE device 1300 according to an embodiment of this application. The second PE device shown in FIG. 14 may perform corresponding steps performed by the second PE device in the methods in the foregoing embodiments.

As shown in FIG. 14, the second PE device 1300 includes a processor 1301, a memory 1302, an interface 1303, and a bus 1304. The interface 1303 may be implemented in a wireless or wired manner, and may be an element such as a network adapter. The processor 1301, the memory 1302, and the interface 1303 are connected using the bus 1304.

The interface 1303 may further include a transmitter and a receiver, and is configured for the second PE device to send information to and receive information from a first PE device and a third PE device, or is configured for the second PE device to send information to and receive information from a second CE device connected to the second PE device. In an example, the interface 1303 is configured to support the processes of steps S103, S106, and S108 in FIG. 3A and FIG. 3B, and the processes of steps S207, S208, S304, S309, S604, S607, S702, and S708 in FIG. 5B to FIG. 10B. The processor 1301 is configured to perform processing performed by the second PE device in the foregoing embodiments. For example, the processor 1301 is configured to switch preferential forwarding statuses of the second PE device relative to a primary PW and a bypass PW, is further configured to generate a PW status notification packet, a fault detection packet, and/or a termination packet, and send the PW status notification packet, the fault detection packet, and/or the termination packet to the first PE device and the third PE device using the interface 1303, is further configured to process PW status notification packets and/or termination packets from the first PE device and the third PE device, and/or is configured to perform other processes of the technologies described in this specification. In an example, the processor 1301 is configured to support the process of step S107 in FIG. 3B, and the processes of steps S206, S207, S208, S305, S310, S605, S606, S607, S701, S702, and S709 in FIG. 5A to FIG. 10B. The memory 1302 includes an operating system 13021 and an application program 13022, and is configured to store programs, code, or instructions. When the processor or a hardware device executes these programs, code, or instructions, the processing processes related to the second PE device in FIG. 3A and FIG. 3B, and FIG. 5A to FIG. 10B may be implemented.

It may be understood that FIG. 14 shows only a simplified design of the second PE device. In actual application, the second PE device may include any quantity of interfaces, processors, memories, and the like, and all second PE devices capable of implementing this application shall fall within the protection scope of this application.

In addition, an embodiment of this application provides a computer storage medium configured to store a computer software instruction used by the second PE device. The computer software instruction includes a program designed for performing the embodiments shown in FIG. 3A and FIG. 3B, and FIG. 5A to FIG. 10B.

Figure 15:
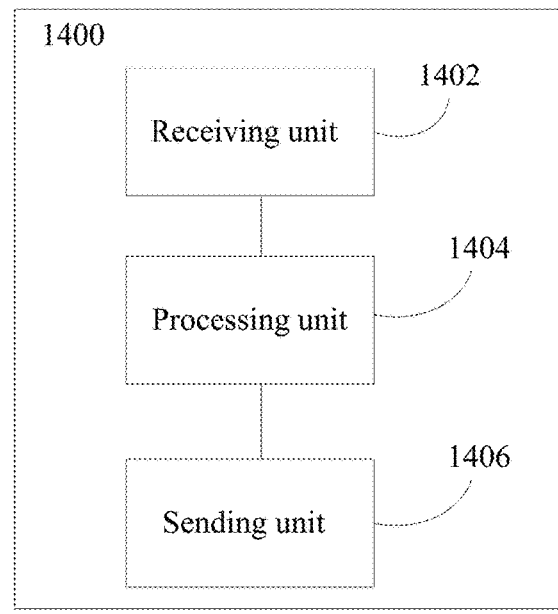
FIG. 15 is a schematic structural diagram of a third PE device according to an embodiment of this application.

FIG. 15 is a schematic structural diagram of a third PE device 1400 according to an embodiment of this application. The third PE device shown in FIG. 15 may perform corresponding steps performed by the third PE device in the methods in the foregoing embodiments. As shown in FIG. 15, the third PE device 1400 includes a receiving unit 1402, a processing unit 1404, and a sending unit 1406.

The receiving unit 1402 is configured to receive a first packet from the first PE device using the secondary PW, where the first packet is used to request to switch the secondary PW from a standby state of not forwarding traffic to a balance state of forwarding traffic.

The sending unit 1406 is configured to forward the first packet to the second PE device using the bypass PW.

The receiving unit 1402 is further configured to receive a response packet from the second PE device using the bypass PW, where the response packet is used to indicate that a switching request in the first packet is accepted.

The processing unit 1404 is configured to switch, based on the response packet, a preferential forwarding status of the third PE device relative to the secondary PW from the standby state of not forwarding traffic to the balance state of forwarding traffic and a preferential forwarding status of the third PE device relative to the bypass PW from a bypass state to the balance state.

Optionally, the processing unit 1404 is further configured to before the sending unit 1406 forwards the first packet to the second PE device using the bypass PW, determine that a bandwidth occupation rate of an outbound interface over which the third PE device sends traffic to the second PE device is less than a predetermined threshold.

Optionally, the processing unit 1404 is further configured to determine that a fault detection packet from the first PE device cannot be received within a predetermined period, and switch the preferential forwarding status of the third PE device relative to the secondary PW from the balance state to the standby state, the sending unit 1406 is further configured to send a fault notification packet to the first PE device, where the fault notification packet is used to notify a fault discovered by the third PE device to the first PE device, the processing unit 1404 is further configured to switch the preferential forwarding status of the third PE device relative to the bypass PW from the balance state to the bypass state, and the sending unit 1406 is further configured to send a termination packet to the second PE device, where the termination packet is used to instruct to terminate the balance state of the bypass PW.

Optionally, the processing unit 1404 is further configured to determine that a fault detection packet from the second PE device cannot be received within a predetermined period, and switch the preferential forwarding status of the third PE device relative to the bypass PW from the balance state to the bypass state, the sending unit 1406 is further configured to send a termination packet to the first PE device, where the termination packet is used to instruct to terminate the balance state of the bypass PW, the receiving unit 1402 is further configured to receive a second packet from the first PE device, where the second packet is used to request to switch the secondary PW from the balance state to an active state or the standby state, and the processing unit 1404 is further configured to switch the preferential forwarding status of the third PE device relative to the secondary PW from the balance state to the active state or the standby state based on the second packet.

The third PE device shown in FIG. 15 may perform the corresponding steps performed by the third PE device in the methods in the foregoing embodiments to ensure that traffic balancing between the primary PW and the secondary PW is implemented when redundancy protection functions of the primary PW and the secondary PW in a VPWS PW are reserved, thereby helping improve bandwidth utilization of the VPWS PW.

Figure 16:
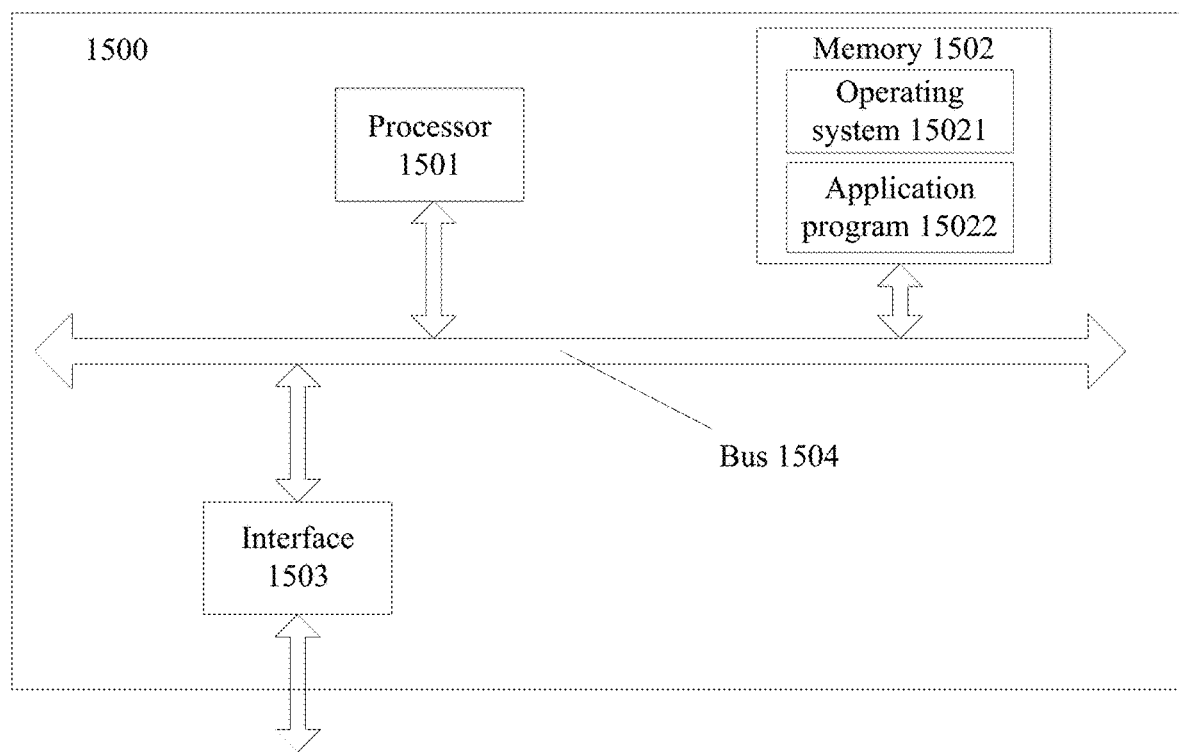
FIG. 16 is a schematic diagram of a hardware structure of a third PE device according to an embodiment of this application.

FIG. 16 is a schematic diagram of a hardware structure of a third PE device 1500 according to an embodiment of this application. The third PE device shown in FIG. 16 may perform corresponding steps performed by the third PE device in the methods in the foregoing embodiments.

As shown in FIG. 16, the third PE device 1500 includes a processor 1501, a memory 1502, an interface 1503, and a bus 1504. The interface 1503 may be implemented in a wireless or wired manner, and may be further an element such as a network adapter. The processor 1501, the memory 1502, and the interface 1503 are connected using the bus 1504.

The interface 1503 may further include a transmitter and a receiver, and is configured for the third PE device to send information to and receive information from a first PE device and a second PE device, or is configured for the third PE device to send information to and receive information from a second CE device connected to the third PE device. In an example, the interface 1503 is configured to support the processes of steps S104, S105, and Sill in FIG. 3A and FIG. 3B, and the processes of steps S204, S209, S307, S308, S504, S507, S704, and S710 in FIG. 5B to FIG. 10A and FIG. 10B. The processor 1501 is configured to perform processing performed by the third PE device in the foregoing embodiments. For example, the processor 1501 is configured to switch preferential forwarding statuses of the third PE device relative to a secondary PW and a bypass PW, is further configured to generate a PW status notification packet, a fault detection packet, and/or a termination packet, and send the PW status notification packet, the fault detection packet, and/or the termination packet to the first PE device and the second PE device using the interface 1503, is further configured to process PW status notification packets and/or termination packets from the first PE device and the second PE device, and/or is configured to perform other processes of the technologies described in this specification. In an example, the processor 1501 is configured to support the process of step S112 in FIG. 3B, and the processes of steps S205, S210, S306, S307, S308, S505, S506, S507, S703, S704, and S711 in FIG. 5B to FIG. 10B. The memory 1502 includes an operating system 15021 and an application program 15022, and is configured to store programs, code, or instructions. When the processor or a hardware device executes these programs, code, or instructions, the processing processes related to the third PE device in FIG. 3A and FIG. 3B, and FIG. 5A to FIG. 10B may be implemented.

It may be understood that FIG. 16 shows only a simplified design of the third PE device. In actual application, the third PE device may include any quantity of interfaces, processors, memories, and the like, and all third PE devices capable of implementing this application shall fall within the protection scope of this application.

In addition, an embodiment of this application provides a computer storage medium configured to store a computer software instruction used by the third PE device. The computer software instruction includes a program designed for performing the embodiments shown in FIG. 3A and FIG. 3B, and FIG. 5A to FIG. 10B.

According to the embodiments shown in FIG. 11 to FIG. 16, optionally, the first packet and the second packet each carry PW status code, and the PW status code is used to indicate that a PW status is the balance state.

FIG. 2 is a schematic structural diagram of a VPWS PW redundancy network according to an embodiment of the present application. The VPWS PW redundancy network includes the first PE device in FIG. 11 or FIG. 12, the second PE device in FIG. 13 or FIG. 14, and the third PE device in FIG. 15 or FIG. 16.

Method or algorithm steps described in combination with the content disclosed in this application may be implemented by hardware, or may be implemented by a processor by executing a software instruction. The software instruction may be formed by a corresponding software module. The software module may be located in a random access memory (RAM), a flash memory, a read-only memory (ROM), an erasable programmable ROM (EPROM), an Electrically EPROM (EEPROM), a register, a hard disk, a removable hard disk, a compact disc ROM (CD-ROM), or a storage medium of any other form known in the art. For example, a storage medium is coupled to a processor such that the processor can read information from the storage medium or write information into the storage medium. Certainly, the storage medium may be a component of the processor. The processor and the storage medium may be located in the Application-Specific Integrated Circuit (ASIC). In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the present application is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or special-purpose computer.

In the foregoing specific embodiments, the objectives, technical solutions, and benefits of this application are further described in detail. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A packet forwarding method, wherein the packet forwarding method is applied to a virtual private wire service (VPWS) pseudo wire (PW) redundancy network, and wherein the packet forwarding method comprises:
   sending, by a first provider edge (PE) device, a first packet to a second PE device using a primary PW, wherein the VPWS PW redundancy network comprises the first PE device, the second PE device, and a third PE device, wherein the primary PW is set up between the first PE device and the second PE device, wherein a secondary PW is set up between the first PE device and the third PE device, wherein a bypass PW is set up between the second PE device and the third PE device, wherein the first packet requests to switch the primary PW from an active state of forwarding traffic to a balance state of forwarding traffic, and wherein the balance state instructs to forward traffic in a traffic balancing manner;
   sending, by the first PE device, a second packet to the third PE device using the secondary PW, wherein the second packet requests to switch the secondary PW from a standby state of not forwarding traffic to the balance state of forwarding traffic;
   receiving, by the first PE device, a response packet from the second PE device using the primary PW, wherein the second PE device is enabled to determine and obtain the response packet based on the first packet and the second packet, wherein the third PE device is enabled to send the second packet to the second PE device using the bypass PW, and wherein the response packet indicates that switching requests in the first packet and the second packet are accepted; and
   switching, by the first PE device based on the response packet, a preferential forwarding status of the first PE device relative to the primary PW from the active state of forwarding traffic to the balance state of forwarding traffic and a preferential forwarding status of the first PE device relative to the secondary PW from the standby state of not forwarding traffic to the balance state of forwarding traffic.

2. The packet forwarding method of claim 1, further comprising:
   receiving, by the first PE device, traffic from a customer edge (CE) device; and
   sending, by the first PE device, the traffic from the CE device to the second PE device and the third PE device in the traffic balancing manner using the primary PW and the secondary PW that are in the balance state.

3. The packet forwarding method of claim 1, wherein the first packet and the second packet each carry PW status code, and wherein the PW status code indicates that a PW status is the balance state.

4. The packet forwarding method of claim 1, wherein before sending the first packet to the second PE device, the packet forwarding method further comprises determining, by the first PE device, that a bandwidth occupation rate at which the first PE device sends traffic to the second PE device exceeds a predetermined threshold.

5. The packet forwarding method of claim 1, further comprising:
   determining, by the first PE device, that a fault detection packet from the second PE device is not received within a predetermined period;
   switching, by the first PE device, the preferential forwarding status of the first PE device relative to the primary PW from the balance state to the standby state;
   sending, by the first PE device, a third packet to the second PE device, wherein the third packet requests to switch the primary PW from the balance state to the standby state;
   switching, by the first PE device, the preferential forwarding status of the first PE device relative to the secondary PW from the balance state to the active state; and
   sending, by the first PE device, a fourth packet to the third PE device, wherein the fourth packet requests to switch the secondary PW from the balance state to the active state.

6. The packet forwarding method of claim 1, further comprising:

determining, by the first PE device, that a fault detection packet from the third PE device is not received within a predetermined period;

switching, by the first PE device, the preferential forwarding status of the first PE device relative to the primary PW from the balance state to the active state;

sending, by the first PE device, a third packet to the second PE device, wherein the third packet requests to switch the primary PW from the balance state to the active state;

switching, by the first PE device, the preferential forwarding status of the first PE device relative to the secondary PW from the balance state to the standby state; and sending, by the first PE device, a fourth packet to the third PE device, wherein the fourth packet requests to switch the secondary PW from the balance state to the standby state.

7. The packet forwarding method of claim 1, further comprising:

receiving, by the first PE device, termination packets from the second PE device and the third PE device, wherein the termination packets instruct to terminate the balance state of the bypass PW;

switching, by the first PE device, the preferential forwarding status of the first PE device relative to the primary PW from the balance state to the active state;

sending, by the first PE device, a third packet to the second PE device, wherein the third packet requests to switch the primary PW from the balance state to the active state;

switching, by the first PE device, the preferential forwarding status of the first PE device relative to the secondary PW from the balance state to the standby state; and sending, by the first PE device, a fourth packet to the third PE device, wherein the fourth packet requests to switch the secondary PW from the balance state to the standby state.

8. A first provider edge (PE) device, wherein the first PE device is applied to a virtual private wire service (VPWS) pseudo wire (PW) redundancy network, and wherein the first PE device comprises:

a non-transitory memory storing instructions; and a processor coupled to the non-transitory memory, wherein the instructions, when executed by the processor, cause the first PE device to be configured to:

send a first packet to a second PE device using a primary PW, wherein the VPWS PW redundancy network comprises the second PE device and a third PE device, wherein the primary PW is set up between the first PE device and the second PE device, wherein a secondary PW is set up between the first PE device and the third PE device, wherein a bypass PW is set up between the second PE device and the third PE device, wherein the first packet requests to switch the primary PW from an active state of forwarding traffic to a balance state of forwarding traffic, and wherein the balance state instructs to forward traffic in a traffic balancing manner;

send a second packet to the third PE device using the secondary PW, wherein the second packet requests to switch the secondary PW from a standby state of not forwarding traffic to the balance state of forwarding traffic;

receive a response packet from the second PE device using the primary PW, wherein the second PE device is enabled to determine and obtain the response packet based on the first packet and the second packet, wherein the third PE device is enabled to send the second packet to the second PE device using the bypass PW, and wherein the response packet indicates that switching requests in the first packet and the second packet are accepted; and switch, based on the response packet, a preferential forwarding status of the first PE device relative to the primary PW from the active state of forwarding traffic to the balance state of forwarding traffic and a preferential forwarding status of the first PE device relative to the secondary PW from the standby state of not forwarding traffic to the balance state of forwarding traffic.

9. The first PE device of claim 8, wherein the instructions, when executed by the processor, further cause the first PE device to be configured to:

receive traffic from a customer edge (CE) device; and send the traffic from the CE device to the second PE device and the third PE device in the traffic balancing manner using the primary PW and the secondary PW that are in the balance state.

10. The first PE device of claim 8, wherein the first packet and the second packet each carry PW status code, and wherein the PW status code indicates that a PW status is the balance state.

11. The first PE device of claim 8, wherein before sending the first packet to the second PE device using the primary PW, the instructions, when executed by the processor, further cause the first PE device to be configured to determine that a bandwidth occupation rate at which the first PE device sends traffic to the second PE device exceeds a predetermined threshold.

12. The first PE device of claim 8, wherein the instructions, when executed by the processor, further cause the first PE device to be configured to:

determine that a fault detection packet from the second PE device is not received within a predetermined period;

switch the preferential forwarding status of the first PE device relative to the primary PW from the balance state to the standby state;

send a third packet to the second PE device, wherein the third packet requests to switch the primary PW from the balance state to the standby state;

switch the preferential forwarding status of the first PE device relative to the secondary PW from the balance state to the active state; and send a fourth packet to the third PE device, wherein the fourth packet requests to switch the secondary PW from the balance state to the active state.

13. The first PE device of claim 8, wherein the instructions, when executed by the processor, further cause the first PE device to be configured to:

determine that a fault detection packet from the third PE device is not received within a predetermined period;

switch the preferential forwarding status of the first PE device relative to the primary PW from the balance state to the active state;

send a third packet to the second PE device, wherein the third packet requests to switch the primary PW from the balance state to the active state;

switch the preferential forwarding status of the first PE device relative to the secondary PW from the balance state to the standby state; and send a fourth packet to the third PE device, wherein the fourth packet requests to switch the secondary PW from the balance state to the standby state.

14. The first PE device of claim 8, wherein the instructions, when executed by the processor, further cause the first PE device to be configured to:
- receive termination packets from the second PE device and the third PE device, wherein the termination packets instruct to terminate the balance state of the bypass PW;
- switch the preferential forwarding status of the first PE device relative to the primary PW from the balance state to the active state;
- send a third packet to the second PE device, wherein the third packet requests to switch the primary PW from the balance state to the active state;
- switch the preferential forwarding status of the first PE device relative to the secondary PW from the balance state to the standby state; and
- send a fourth packet to the third PE device, wherein the fourth packet requests to switch the secondary PW from the balance state to the standby state.

15. A second provider edge (PE) device, wherein the second PE device is applied to a virtual private wire service (VPWS) pseudo wire (PW) redundancy network, and wherein the second PE device comprises:
- a non-transitory memory storing instructions; and
- a processor coupled to the non-transitory memory, wherein the instructions, when executed by the processor, cause the second PE device to be configured to:
  - receive a first packet from a first PE device using a primary PW, wherein the VPWS PW redundancy network comprises the first PE device and a third PE device, wherein the primary PW is set up between the first PE device and the second PE device, wherein a secondary PW is set up between the first PE device and the third PE device, wherein a bypass PW is set up between the second PE device and the third PE device, wherein the first packet requests to switch the primary PW from an active state of forwarding traffic to a balance state of forwarding traffic, and wherein the balance state instructs to forward traffic in a traffic balancing manner;
  - receive, using the bypass PW, a second packet from the third PE device, wherein the second packet requests to switch the secondary PW from a standby state of not forwarding traffic to the balance state of forwarding traffic;
  - generate a response packet based on the first packet and the second packet;
  - switch a preferential forwarding status of the second PE device relative to the primary PW from the active state of forwarding traffic to the balance state of forwarding traffic;
  - switch a preferential forwarding status of the second PE device relative to the bypass PW from a bypass state to the balance state;
  - send the response packet to the first PE device using the primary PW; and
  - send the response packet to the third PE device using the bypass PW, wherein the response packet indicates that switching requests in the first packet and the second packet are accepted.

16. The second PE device of claim 15, wherein a customer edge (CE) device is coupled to the second PE device and the third PE device in the VPWS PW redundancy network through dual homing using a multi-chassis trunk (MC-trunk) link, wherein a link between the CE device and the second PE device is a primary link, wherein a link between the CE device and the third PE device is a secondary link, and wherein the instructions, when executed by the processor, further cause the second PE device to be configured to:
- receive traffic from the CE device using the primary link; and
- send the traffic from the CE device to the first PE device and the third PE device in the traffic balancing manner using the primary PW and the bypass PW in the balance state.

17. The second PE device of claim 16, wherein the instructions, when executed by the processor, further cause the second PE device to be configured to:
- determine that a fault detection packet from the CE device is not received within a predetermined period;
- determine that the preferential forwarding status of the second PE device relative to the primary PW is the balance state;
- maintain the balance state relative to the primary PW; and
- skip controlling the second PE device to send, to the first PE device, a packet switching the balance state of the primary PW.

18. The second PE device of claim 15, wherein the first packet and the second packet each carry PW status code, and wherein the PW status code indicates that a PW status is the balance state.

19. The second PE device of claim 15, wherein before generating the response packet, switching the preferential forwarding status of the second PE device, and switching the preferential forwarding status of the second PE device, the instructions, when executed by the processor, further cause the second PE device to be configured to determine that a bandwidth occupation rate of an outbound interface over which the second PE device sends traffic to the third PE device is less than a predetermined threshold.

20. The second PE device of claim 15, wherein the instructions, when executed by the processor, further cause the second PE device to be configured to:
- determine that a fault detection packet from the first PE device is not received within a predetermined period;
- switch the preferential forwarding status of the second PE device relative to the primary PW from the balance state to the standby state;
- send a fault notification packet to the first PE device, wherein the fault notification packet notifies a fault discovered by the second PE device to the first PE device;
- switch the preferential forwarding status of the second PE device relative to the bypass PW from the balance state to the bypass state; and
- send a termination packet to the third PE device, wherein the termination packet instructs to terminate the balance state of the bypass PW.

21. The second PE device of claim 15, wherein the instructions, when executed by the processor, further cause the second PE device to be configured to:
- determine that a fault detection packet from the third PE device is not received within a predetermined period;
- switch the preferential forwarding status of the second PE device relative to the bypass PW from the balance state to the bypass state;
- send a termination packet to the first PE device, wherein the termination packet instructs to terminate the balance state of the bypass PW;
- receive a third packet from the first PE device, wherein the third packet requests to switch the primary PW from the balance state to the active state; and switch the preferential forwarding status of the second PE device relative to the primary PW from the balance state to the active state based on the third packet.

22. A third provider edge (PE) device, wherein the third PE device is applied to a virtual private wire service (VPWS) pseudo wire (PW) redundancy network, and wherein the third PE device comprises:
a non-transitory memory storing instructions; and
a processor coupled to the non-transitory memory, wherein the instructions, when executed by the processor, cause the third PE device to be configured to:
receive a first packet from a first PE device using a secondary PW, wherein the VPWS PW redundancy network comprises the first PE device and a second PE device, wherein a primary PW is set up between the first PE device and the second PE device, wherein the secondary PW is set up between the first PE device and the third PE device, wherein a bypass PW is set up between the second PE device and the third PE device, and wherein the first packet requests to switch the secondary PW from a standby state of not forwarding traffic to a balance state of forwarding traffic;
send the first packet to the second PE device using the bypass PW;
receive a response packet from the second PE device using the bypass PW, wherein the response packet indicates that a switching request in the first packet is accepted;
switch, based on the response packet, a preferential forwarding status of the third PE device relative to the secondary PW from the standby state of not forwarding traffic to the balance state of forwarding traffic; and
switch a preferential forwarding status of the third PE device relative to the bypass PW from a bypass state to the balance state.

23. The third PE device of claim 22, wherein the first packet carries PW status code, and wherein the PW status code indicates that a PW status is the balance state.

24. The third PE device of claim 22, wherein before sending the first packet to the second PE device using the bypass PW, the instructions, when executed by the processor, further cause the third PE device to be configured to determine that a bandwidth occupation rate of an outbound interface over which the third PE device sends traffic to the second PE device is less than a predetermined threshold.

25. The third PE device of claim 22, wherein the instructions, when executed by the processor, further cause the third PE device to be configured to:
determine that a fault detection packet from the first PE device is not received within a predetermined period;
switch the preferential forwarding status of the third PE device relative to the secondary PW from the balance state to the standby state;
send a fault notification packet to the first PE device, wherein the fault notification packet notifies a fault discovered by the third PE device to the first PE device;
switch the preferential forwarding status of the third PE device relative to the bypass PW from the balance state to the bypass state; and
send a termination packet to the second PE device, wherein the termination packet instructs to terminate the balance state of the bypass PW.

26. The third PE device of claim 22, wherein the instructions, when executed by the processor, further cause the third PE device to be configured to:
determine that a fault detection packet from the second PE device is not received within a predetermined period;
switch the preferential forwarding status of the third PE device relative to the bypass PW from the balance state to the bypass state;
send a termination packet to the first PE device, wherein the termination packet instructs to terminate the balance state of the bypass PW;
receive a second packet from the first PE device, wherein the second packet requests to switch the secondary PW from the balance state to the active state or the standby state; and
switch the preferential forwarding status of the third PE device relative to the secondary PW from the balance state to the active state or the standby state based on the second packet.

* * * * *